(12) United States Patent
Raval et al.

(10) Patent No.: US 10,509,736 B2
(45) Date of Patent: Dec. 17, 2019

(54) CONTROLLING ACCESS BY IO DEVICES TO PAGES IN A MEMORY IN A COMPUTING DEVICE

(71) Applicant: Advanced Micro Devices, Inc., Santa Clara, CA (US)

(72) Inventors: Nippon Raval, Mississauga (CA); David A. Kaplan, Austin, TX (US); Philip Ng, Toronto (CA)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 15/949,940

(22) Filed: Apr. 10, 2018

(65) Prior Publication Data

US 2018/0232320 A1 Aug. 16, 2018

Related U.S. Application Data

(63) Continuation-in-part of application No. 15/417,632, filed on Jan. 27, 2017, and a continuation-in-part of application No. 15/224,302, filed on Jul. 29, 2016, now Pat. No. 10,169,244.

(60) Provisional application No. 62/519,101, filed on Jun. 13, 2017.

(51) Int. Cl.
*G06F 12/10* (2016.01)
*G06F 12/14* (2006.01)
*G06F 12/1027* (2016.01)
*G06F 12/1009* (2016.01)
*G06F 9/455* (2018.01)
*G06F 12/1081* (2016.01)
*G06F 12/109* (2016.01)
*G06F 12/1018* (2016.01)

(52) U.S. Cl.
CPC ...... *G06F 12/1475* (2013.01); *G06F 9/45558* (2013.01); *G06F 12/1009* (2013.01); *G06F 12/109* (2013.01); *G06F 12/1027* (2013.01); *G06F 12/1081* (2013.01); *G06F 12/1408* (2013.01); *G06F 12/1491* (2013.01); *G06F 12/1018* (2013.01); *G06F 2009/45579* (2013.01); *G06F 2009/45583* (2013.01); *G06F 2212/1052* (2013.01); *G06F 2212/151* (2013.01); *G06F 2212/651* (2013.01); *G06F 2212/683* (2013.01)

(58) Field of Classification Search
CPC ....... G06F 9/45558; G06F 2009/45583; G06F 12/1009; G06F 12/1027; G06F 12/1475; G06F 2009/45579; G06F 2212/683
USPC .......................................................... 711/6
See application file for complete search history.

(56) References Cited

U.S. PATENT DOCUMENTS

2016/0378678 A1* 12/2016 Lemay et al. ...... G06F 12/1009
711/163

* cited by examiner

*Primary Examiner* — Hua J Song
(74) *Attorney, Agent, or Firm* — Park, Vaughan, Fleming & Dowler LLP

(57) ABSTRACT

An input-output (IO) memory management unit (IOMMU) uses a reverse map table (RMT) to ensure that address translations acquired from a nested page table are correct and that IO devices are permitted to access pages in a memory when performing memory accesses in a computing device. A translation lookaside buffer (TLB) flushing mechanism is used to invalidate address translation information in TLBs that are affected by changes in the RMT. A modified Address Translation Caching (ATC) mechanism may be used, in which only partial address translation information is provided to IO devices so that the RMT is checked when performing memory accesses for the IO devices using the cached address translation information.

18 Claims, 13 Drawing Sheets

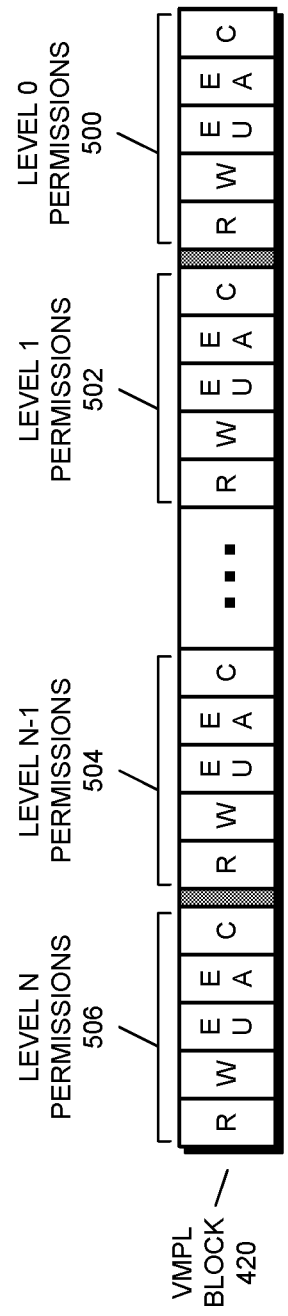

CONTROLLING ACCESS BY IO DEVICES TO PAGES IN A MEMORY IN A COMPUTING DEVICE

RELATED APPLICATIONS

The instant application is a continuation in part of, and hereby claims priority to, pending U.S. patent application Ser. No. 15/224,302, which was filed on 29 Jul. 2016, and pending U.S. patent application Ser. No. 15/417,632, which was filed on 27 Jan. 2017. The instant application also claims priority to U.S. provisional application No. 62/519,101, which was filed on 13 Jun. 2017. Each of these applications are incorporated by reference in their entireties herein.

BACKGROUND

Related Art

Some computing devices execute virtual machines, which are software entities that emulate or otherwise interface with the hardware of the computing devices in order to provide support for executing software programs. For example, a virtual machine may use hardware elements in a computing device (processors, memories, network interfaces, etc.) to provide support for running one or more instances of operating systems, called guest operating systems. The guest operating systems in turn provide support for executing other software programs such as applications, databases, etc.

Some of the computing devices execute two or more virtual machines concurrently (e.g., in corresponding time slices, in parallel on one or more processor cores, etc.). In such computing devices, each virtual machine may have access to hardware resources that are allocated exclusively for the use of the virtual machine. For example, each virtual machine may be allocated a corresponding region of a memory in a computing device for the exclusive use of the virtual machine. In these computing devices, a first virtual machine may be prevented from accessing a region of memory allocated to a second virtual machine and vice versa. In some of these computing devices, a hypervisor enforces access controls for each virtual machine. Hypervisors are software entities that operate/execute on computing devices and function as a manager or controller for virtual machines executing on the computing device. For example, hypervisors may start or initialize virtual machines, control accesses of computing device hardware by virtual machines, terminate or close virtual machines, etc.

Although hypervisors are assumed to provide access controls for virtual machines, a hypervisor may not always properly enforce the access controls. For example, the program code for a hypervisor may be replaced with malicious program code, a hypervisor's program code may become corrupted or include an error, etc. In such cases, a hypervisor may deliberately or unintentionally allow a virtual machine to access computing hardware allocated to another virtual machine. For example, in some computing devices, a hypervisor is responsible for providing address information to enable virtual machines to access data in corresponding areas of memory. In these computing devices, the hypervisor provides translations between local addresses used by virtual machines (or software executing thereon) and the physical addresses where data is actually located in memory. When the hypervisor is not functioning correctly, the hypervisor may provide incorrect address information, thereby directing virtual machines to access data in unexpected or unwanted areas of memory (e.g., areas of memory allocated to other virtual machines). By providing incorrect address information as described, a hypervisor can cause data to be accessed in violation of one or more access controls or rules.

In addition to the address translations provided by the hypervisor being used by virtual machines, in some of these computing devices, the address translations are used by input-output (IO) devices to access pages of memory allocated to particular virtual machines. For example, when interacting with a virtual machine, an IO device such as a disk controller, a network interface device, a Peripheral Component Interface Express or PCIe bus device, etc. may perform a direct memory access (DMA) operation to write data in one or more pages of memory that are allocated to the virtual machine. Similarly to the operations involving virtual machines described above, operations performed by IO devices can be maliciously or erroneously misdirected when the hypervisor provides incorrect address information.

BRIEF DESCRIPTION OF THE FIGURES

FIG. 4 presents a block diagram illustrating a reverse map table in accordance with some embodiments.

FIG. 5 presents a block diagram illustrating a virtual machine permissions level block in accordance with some embodiments.

DETAILED DESCRIPTION

Figure 1:
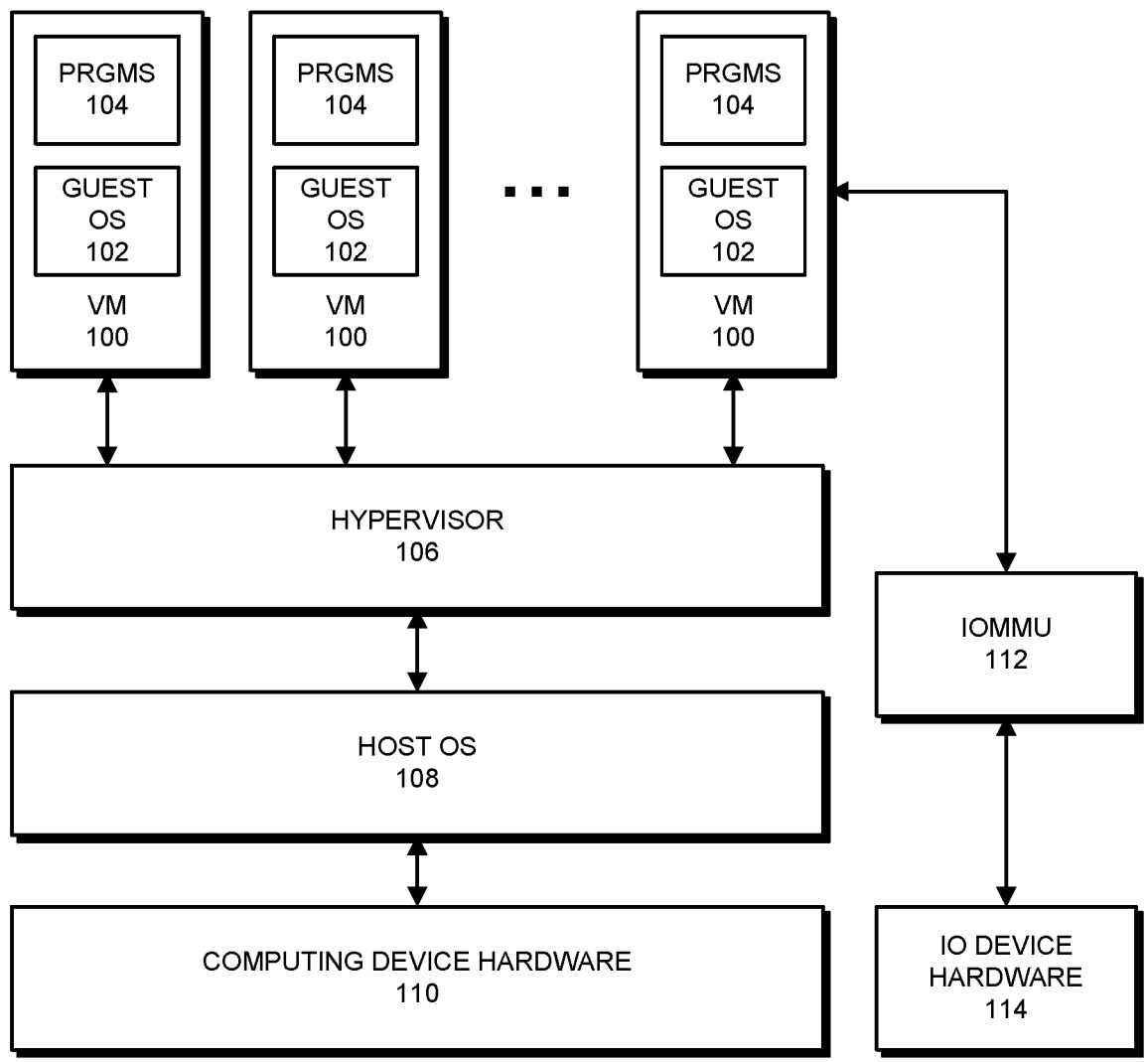
FIG. 1 presents a block diagram illustrating virtual machines and a hypervisor in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Virtual Memory

In the described embodiments, a computing device uses a virtual memory technique for handling data accesses by programs being executed in the computing device or by IO devices interacting with the computing device. For example, the executed programs may include applications, operating systems, device drivers, virtual machines, firmware, etc., and the IO devices may include devices such as disk controllers, network interface devices, Peripheral Component Interface Express (PCIe) bus devices, graphics processing units (GPUs), etc.). Generally, when data is accessed by a program or an IO device in the computing device, a block or page of memory of a given size (e.g., 4 kB, 2 MB, etc.) that includes the data is copied from mass storage (e.g., a disk drive or semiconductor memory) to an available physical location in a memory in the computing device or is newly created in the memory. In order to avoid programs and IO devices being required to keep track of the physical locations of pages in memory, the computing device keeps track of the physical locations of the pages for the programs or IO devices. The programs and IO devices access memory using virtual addresses in virtual address spaces, which are local address spaces that are specific to corresponding programs or IO devices, instead of accessing memory using addresses based on the physical locations of pages (or physical addresses). From a program's or an IO device's perspective, virtual addresses indicate the actual physical locations where data is stored in memory, and memory accesses are made by programs and IO devices using the virtual addresses accordingly. The virtual addresses, however, may not map directly to the physical addresses of the physical locations where data is stored in pages in the memory. As part of keeping track the physical locations of pages, the computing device translates the virtual addresses used by the programs and IO devices in memory access requests into the physical addresses where the data is actually located. The computing device then uses the physical addresses to perform the memory accesses for the programs and IO devices.

In order to enable the above-described virtual address to physical address translations, the computing device includes a page table. The page table is a record stored in a memory of the computing device that includes an entry, or a page table entry, with virtual address to physical address translation information for pages of data that are stored in the memory. In other words, the page table includes mappings of virtual addresses to corresponding physical addresses. Upon receiving a request from a program or an IO device to access memory at a given virtual address, the computing device acquires corresponding physical address information from the page table by performing a page table walk, during which the page table is searched for a page table entry that provides the physical address associated with the virtual address.

Because the above-described page table walks are relatively slow, it is desirable to avoid performing page table walks. The computing device therefore includes translation lookaside buffers (TLBs), which are local caches that are used for storing a limited number of copies of address translation information acquired during page table walks (i.e., information based on page table entries). For example, a processor core, an input-output memory management unit (IOMMU) via which an IO device accesses memory, or an IO device may include a corresponding TLB for locally storing copies of information based on page table entries. During operation, the processor core, IOMMU, or IO device first attempts to acquire cached page table entries from the corresponding TLB for performing virtual address to physical address translations. When the copy of the corresponding page table entry is not present in the TLB (i.e., when a miss occurs), the processor core or the IOMMU performs a page table walk to acquire the desired page table entry—and caches a copy of the acquired page table entry in the TLB.

Virtual Machines, Hypervisors, and Hierarchical Page Tables

In the described embodiments, a computing device executes virtual machines, which are software entities that emulate or otherwise interface with the hardware of the computing devices in order to provide support for executing software programs. For example, a virtual machine may use hardware elements in a computing device (e.g., processors, memories, IO devices, etc.) to provide support for running one or more instances of operating systems, called guest operating systems. The guest operating systems in turn provide support for executing other software programs such as applications, databases, etc.

In the described embodiments, the computing device may execute two or more virtual machines concurrently (e.g., in corresponding time slices, in parallel on one or more processor cores, etc.). In these embodiments, each virtual machine may be associated with various hardware resources that are allocated for the virtual machine's use. For example, each virtual machine may be provided with exclusive access to allocated region(s) of memory (e.g., contiguous or non-contiguous blocks of memory). In other words, a first virtual machine may be prevented from accessing pages of data in regions of memory associated with a second virtual machine and vice versa. In the described embodiments, a hypervisor enforces access controls for each virtual machine. A hypervisor is a software entity that operates or executes on the computing device and functions as a manager or controller for the virtual machines executing on the computing device. For example, the hypervisor may start or initialize virtual machines, control accesses of computing device hardware by virtual machines, terminate or close virtual machines, etc.

FIG. 1 presents a block diagram illustrating virtual machines and a hypervisor in accordance with some embodiments. As can be seen in FIG. 1, there are three virtual machines (VM) 100, each of which executes a guest operating system (GUEST OS) 102 and one or more programs (PRGRMS) 104, such as databases, software applications, etc. The virtual machines 100 communicate with a hypervisor 106, which interfaces between a host operating system (HOST OS) 108 and the virtual machines 100. Host operating system 108 provides an interface between computing device hardware 110 and hypervisor 106. In addition, in some embodiments, an IOMMU 112 interfaces between IO device hardware 114 and the virtual machines 100, such as for direct mapped IO devices. Although various elements are presented in FIG. 1, in some embodiments, different arrangements of elements are present. For example, in some embodiments, host operating system 108 is not present and hypervisor 106 communicates more directly with computing device hardware 110. As another example, a different number of virtual machines 100 may be present or IOMMU 112 may interface between more than one virtual machine 100 and IO device hardware 114.

In the described embodiments, guest operating systems, the IOMMU/IO devices, and the hypervisor use the above-described virtual memory technique. A hierarchy of page tables is therefore maintained in the computing device. Within the hierarchy of page tables, guest operating systems and IO devices are associated with local page tables (e.g., a guest page table or an input-output page table (IO page table)) and the hypervisor is associated with a nested page table. During operation, and using a virtual machine as an example, upon receiving a request from a processor for a translation from a virtual address used by a program executing under a guest operating system to a system physical address, a hardware table walker (i.e., a circuit configured to perform page table walks) uses the guest page table and the nested page table to perform the translation. More specifically, the table walker uses the guest page table to translate the virtual address used by the program into a guest physical address, which is an address that is local to the guest operating system. Because the guest physical address may not map directly to a location in memory where data (or an instruction, etc.) to be accessed by the program is stored, the table walker uses the nested page table to translate the guest physical address into a system physical address, which is an address that indicates the actual location in memory where the data is stored. Upon acquiring the system physical address, the table walker provides the system physical address for use in accessing the data. The translation to the system physical address may also be cached in a TLB.

A set of operations that is similar to the above-described translation operations for a virtual machine is performed by a hardware IO table walker in an input-output memory management unit (IOMMU) in order to translate an IO device virtual address into a system physical address for use in accessing data in a page of memory. For example, the IO table walker may acquire a system physical address to enable an IO device to perform a direct memory access (DMA) operation for writing data in one or more pages of memory allocated to a virtual machine. More specifically, for the translation operation, the IO table walker performs a walk in the IO page table to acquire a guest physical address associated with the IO device virtual address. The IO table walker then uses the nested page table to translate the guest physical address into a system physical address, which is an address that indicates the actual location in memory where the data is stored. Upon acquiring the system physical address, the IO table walker uses the system physical address for accessing memory. The IOMMU may also cache the translation to the system physical address in a TLB in the IOMMU.

In the described embodiments, the hypervisor can perform various operations on information in the nested page table. For example, hypervisor can update (i.e., overwrite) mappings from guest physical addresses to system physical addresses, etc. As described below, the described embodiments perform operations to ensure that information in the nested page table has not been changed by the hypervisor (maliciously, erroneously, etc.) in such a way that incorrect mappings/translations are provided by the hypervisor.

Overview

In the described embodiments, pages in a memory of a computing device can be "private" pages that are allocated for the exclusive use of a given virtual machine among multiple virtual machines executed by the computing device. In these embodiments, IO devices (e.g., disk controllers, network interface devices, PCIe bus devices, etc.) are permitted, in certain circumstances, to access private pages of memory to enable interaction with the virtual machines to which the pages are allocated. For example, a disk controller may access a page of memory to write data therein that is destined for the corresponding virtual machine or a software program running thereon. In the described embodiments, various operations are performed by an input-output memory management unit (IOMMU) and other functional blocks in the computing device to ensure that pages that have been allocated to virtual machines are protected against unwanted accesses by IO devices. For example, the described embodiments include a reverse map table (RMT) that is used for controlling access by IO devices and virtual machines to pages in memory that are allocated to virtual machines. As another example, in the described embodiments, data in a virtual machine's pages may be encrypted so that only IO devices with a specified key are able to encrypt/decrypt the data to enable accesses.

In the described embodiments, the reverse map table is used to ensure that, among other things, a hypervisor (and/or another entity in the computing device) has not remapped translations from guest physical addresses to system physical addresses in the nested page table. The reverse map table includes information that can be used to determine, along with the other things, whether a system physical address acquired during a table walk of a nested page table for a guest physical address matches a previously-used system physical address. In other words, the reverse map table can be used to ensure that a system physical address for a given page in memory is matched to only one guest physical address at a time.

In some embodiments, when translating a guest physical address into a system physical address based on an access request from an IO device to access a page of memory, an IO table walker, i.e., a hardware table walker in the IOMMU, performs a table walk of the nested page table to acquire, from a corresponding entry in the nested page table, the system physical address. It is unknown whether the nested page table, and thus the corresponding entry, has been modified, and so it is unknown whether the system physical address is properly mapped to the guest physical address in the corresponding entry. The IO table walker, therefore, upon acquiring the system physical address from the corresponding entry, performs various checks in the reverse map table to ensure that the system physical address is properly mapped to the guest physical address and that the requesting IO device is permitted to access the page. One of the checks performed by the IO table walker is a check of whether an entry in the reverse map table corresponding to the system physical address has a recorded guest physical address that matches the guest physical address from the request. When the recorded guest physical address from the reverse map table does not match the guest physical address from the request, and thus the system physical address is improperly mapped to the guest physical address in the nested page table, the IO table walker halts/fails the translation and signals an error message or fault to the IO device. On the other hand, when the guest physical addresses match, the system physical address is properly mapped to the guest physical address in the nested page table. When the system physical address is properly mapped, the outcomes of one or more other checks of the information in the reverse map table are used to determine whether the system physical address is to be used for performing the requested access for the IO device, as described below.

In some embodiments, the one or more other checks of the information in the reverse map table include checks of information in the entry in the reverse map table that indicates whether the IO device—or the corresponding virtual machine, whose identifier, etc., the IO device uses when accessing the corresponding page—is permitted to perform the requested access in the page of memory. For example, in some embodiments, the entry in the reverse map table includes a recorded guest identifier (ID) that identifies the virtual machine to which the page is allocated. In some embodiments, IO devices provide identifiers (e.g., a peripheral component interface (PCI) bus/device/function or BDF identifier) at startup or another time and the IO table walker, upon receiving an access request from the IO device, uses the IO device identifier to look up a guest ID in a mapping table in which the IOMMU maintains mappings from IO device identifiers to guest IDs. When the recorded guest ID and the guest ID associated with the IO device from the mapping table do not match, the page is currently recorded as being allocated to a different virtual machine than is associated with the IO device, and the IO table walker determines that the system physical address is not to be provided for use in performing the requested access for the IO device. In this case, the IO table walker halts/fails the translation and signals an error message or fault to the IO device. Depending on the embodiment, there may be additional checks of the information in the reverse map table to determine if the IO device is permitted to perform the requested access—as described in more detail below. When all the checks pass, e.g., when the recorded guest ID and the guest ID associated with the IO device match, etc., the IO table walker determines that the system physical address can be provided for use in performing the requested access for the IO device.

In some embodiments, the computing device performs operations to prevent stale (no longer current) TLB entries from being used for performing address translations. In these embodiments, after checking the information in the reverse map table and determining that the system physical address is permitted to used for performing corresponding accesses on behalf of an IO device, an entity such as a processor or the IOMMU may cache, in a corresponding TLB, guest physical address (or IO device virtual address) to system physical address translation information. The entity may then use the cached translation information from the TLB for performing translations—and thereby avoid performing a table walk to acquire the system physical address. In these embodiments, it may occur that information in the reverse map table entry associated with the system physical address is changed in such a way as to render the system physical address impermissible for use in performing memory accesses on behalf of IO devices. For example, a hypervisor (or other entity) may update or otherwise alter the entry, perhaps maliciously or erroneously. In the event of such a change in the reverse map table, in order to avoid using cached translation information that may be stale and incorrect, the computing device (e.g., a processor) sends, to entities in the computing device (e.g., the processors and the IOMMU) a specified request message to cause the entities to flush the corresponding TLBs. In this way, the possibly stale translation information is invalidated or otherwise removed from availability, thereby avoiding using the stale translation information.

In some embodiments, IO devices support a mechanism called address translation caching (ATC). Ordinarily, for ATC, an IO device prefetches and locally caches, in an IOTLB, IO device virtual address to system physical address translation information. This can help to prepare the IO device to perform accesses in corresponding pages of memory at a later time. Such caching of full translation information, however, is not permitted in the described embodiments in view of the above-described use of the reverse map table. In some embodiments, therefore, a modified ATC scheme is used in which only partial address translation information is provided to IO devices to be cached in IOTLBs. In these embodiments, the IOMMU provides, in response to ATC requests from IO devices, only guest physical addresses to be cached in IOTLBs—so that the IO devices are not provided system physical addresses as with unmodified ATC. When an IO device makes accesses using guest physical addresses retrieved from the IOTLB, the guest physical addresses are translated by the IO table walker, using the nested page table, into system physical addresses. In other words, using modified ATC, an IO device emits memory access requests (e.g., direct memory access (DMA) requests) that include guest physical addresses retrieved from the IOTLB, and the IO table walker uses the nested page table to translate the guest physical addresses from the memory access requests into system physical addresses. During the translation from guest physical addresses to a system physical addresses, the IO table walker checks a current state of the reverse map table to ensure that the system physical addresses are permitted to be used for performing the requested memory accesses for the IO device, thereby ensuring that the protections of the reverse map table are extended to cached address information that is used by IO devices.

By using the reverse map table, the described embodiments enable the detection of potentially malicious or erroneous modifications of the nested page table. Avoiding such modifications of the nested page table can improve the security of data for virtual machines in the computing device by avoiding the hypervisor (and/or another entity) improperly remapping guest physical addresses to system physical addresses to direct virtual machines to access (e.g., overwrite, execute, etc.) data in unknown, unwanted, or incorrect areas of memory (including areas of memory allocated to other virtual machines). In other words, the described embodiments can improve security of data by enforcing rules such as: each page in memory is only permitted to be associated with a single/unique guest physical address (no guest physical address aliasing is allowed), and in-use private guest pages cannot be remapped without involving/informing the corresponding virtual machine as described herein. In addition, alone or in combination with other techniques, such as encryption of virtual machine memory regions and protection for virtual machine processor state (e.g., registers, etc.), the described embodiments can avoid the need for implicit trust in hypervisors, which can simplify administration, improve security, etc. for computing devices. The described embodiments can therefore improve the security, operational stability, and value to consumers of computing devices.

Computing Device

Figure 2:
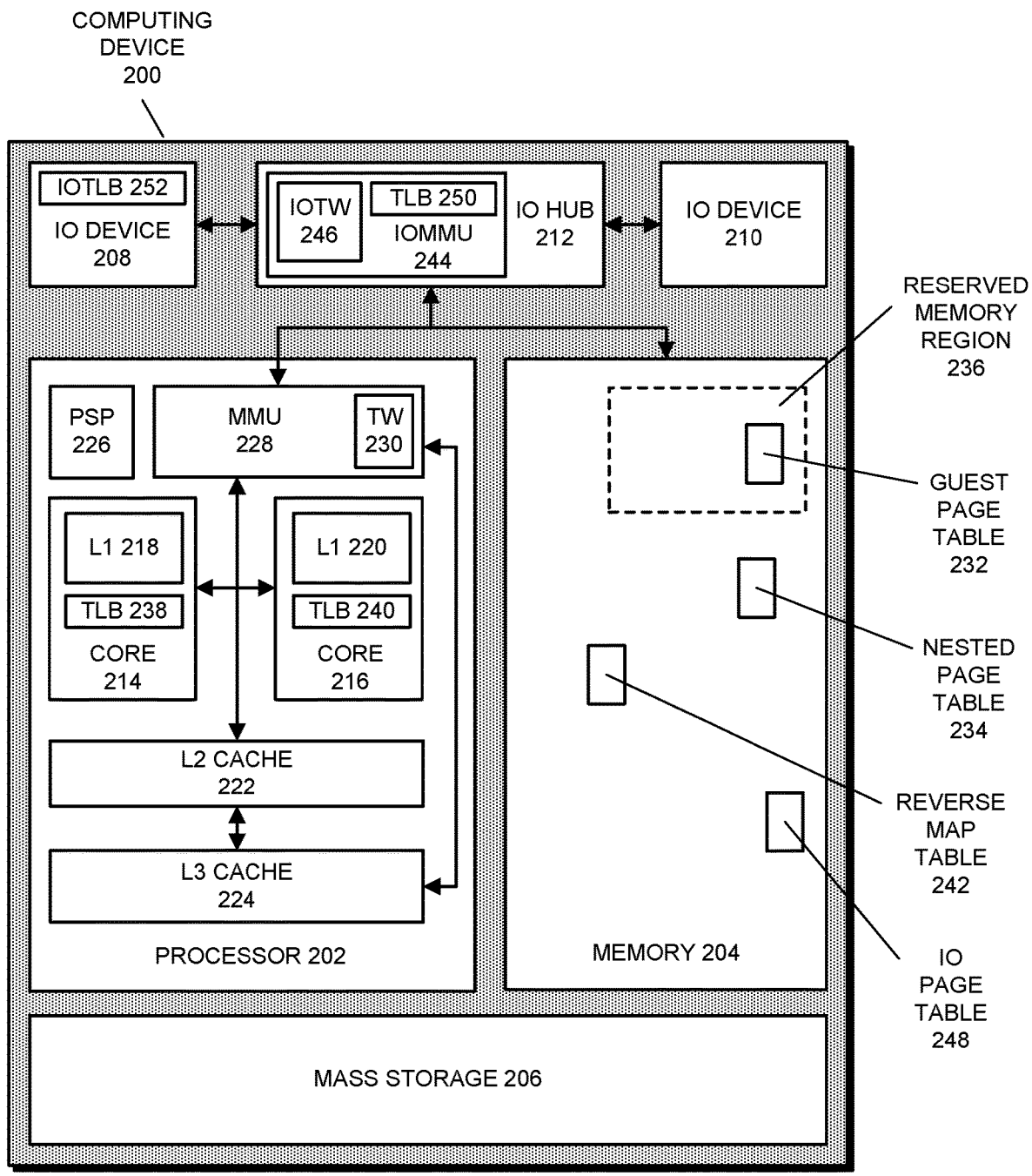
FIG. 2 presents a block diagram illustrating a computing device in accordance with some embodiments.

FIG. 2 presents a block diagram illustrating a computing device 200 in accordance with some embodiments. As can be seen in FIG. 2, computing device 200 includes processor 202, memory 204, mass storage 206, input-output (IO)

devices 208-210, and input-output (IO) hub 212. In FIG. 2, computing device 200 is shaded to enable distinction of the various figure elements.

Processor 202 is a functional block that performs computational operations in computing device 200. Processor 202 includes two cores 214-216, each of which includes one or more computational mechanisms such as central processing units (CPUs), graphics processing units (GPUs), embedded processors, application specific integrated circuits (ASICs), and/or other computational mechanisms.

Processor 202 also includes cache memories (or caches) that are used for locally storing data and instructions that are used by cores 214-216 for performing computational operations. As can be seen in FIG. 2, the caches in processor 202 include level-one (L1) caches 218-220 (L1 218 and L1 220) in each of cores 214-216. Each L1 cache includes memory circuits such as one or more of static random access memory (SRAM), dynamic random access memory (DRAM), double data rate synchronous DRAM (DDR SDRAM), and/or other types of memory circuits for storing data and instructions for use by the corresponding core 214-216, as well as control circuits for handling accesses of the data and instructions that are stored in the memory circuits. Processor 202 additionally includes a shared level-two (L2) cache 222 that includes memory circuits such as one or more of SRAM, DRAM, DDR SDRAM, and/or other types of memory circuits for storing data and instructions for use by both cores 214-216, as well as control circuits for handling accesses of the data and instructions that are stored in the memory circuits. Processor 202 further includes a shared level-three (L3) cache 224 that includes memory circuits such as one or more of SRAM, DRAM, DDR SDRAM, and/or other types of memory circuits for storing data and instructions for use by both cores 214-216, as well as control circuits for handling accesses of the data and instructions that are stored in the memory circuits.

Processor 202 additionally includes platform security processor (PSP) 226. Platform security processor 226 comprises a processor core, an ASIC, and/or other functional block(s) for performing security operations in computing device 200. Generally, platform security processor 226 is known to be secure against malicious or erroneous behavior of hardware and software entities, and thus can be used within computing device 200 for securing operations that are susceptible to such behavior. For example, platform security processor 226 may perform operations associated with enabling a trusted execution environment in computing device 200, such as performing encryption operations (e.g., key generation, encryption/decryption of data, etc.), registration and/or authentication of hardware and software entities, etc. In some embodiments, platform security processor 226 performs at least some of the operations described herein for controlling access by virtual machines and IO devices to pages in memory 204.

Memory 204 is a memory in computing device 200 (e.g., a "main" memory), and includes memory circuits such as one or more of DRAM, DDR SDRAM, non-volatile random access memory (NVRAM), and/or other types of memory circuits for storing data and instructions for use by functional blocks in computing device 200, as well as control circuits for handling accesses of the data and instructions that are stored in the memory circuits.

In some embodiments, computing device 200 includes a mass-storage device, mass storage 206, such as a high-capacity semiconductor memory (a non-volatile semiconductor memory such as a flash memory, an NVRAM, etc.), a disk drive (hard drive, etc.), an optical drive, etc. that stores data and instructions for use in computing device 200. In the described embodiments, mass storage 206 holds data and instructions that are acquired and stored in memory 204 for subsequent use by functional blocks in computing device 200. For example, data and/or instructions may be retrieved from mass storage 206 in blocks or pages of a given size (e.g., 4 kB, 2 MB, 1 GB, etc.) and the pages can be stored in memory 204. In addition, pages may be newly created at an available physical location in memory 204 (e.g., for storing computational results, etc.). Pages retrieved from mass storage 206 and stored in memory 204 may be reserved for the exclusive access of a particular virtual machine and/or may have other access requirements (restrictions on access types, etc.), as described in more detail below.

Returning to processor 202, memory management unit (MMU) 228 is a functional block that handles memory access requests. When data and instructions are to be accessed by a functional block in processor 202 (i.e., read, written, checked/verified, deleted, invalidated, etc. by core 214 or another functional block), the functional block sends a memory access request to memory management unit 228. Memory management unit 228 then sends a corresponding request to one or more of L2 cache 222, L3 cache 224, and memory 204 for satisfaction/resolution of the memory access request. For example, if data is to be retrieved based on the memory access request, memory management unit 228 may acquire the data from L2 cache 222, L3 cache 224, or memory 204 (or mass storage 206, should the data not be present in one of L2 cache 222, L3 cache 224, or memory 204) and forward the data to the requesting functional block.

Memory management unit 228 includes a hardware table walker (TW) 230. Table walker 230 is a functional block that performs operations relating to acquiring address translations from page tables (e.g., page table walks, etc.) and checking a reverse map table to ensure that accesses by virtual machines are permissible, as described herein. More specifically, and as described above, computing device 200 uses virtual memory to enable software programs (e.g., executed by cores 214-216) to access memory using virtual addresses that are translated into physical addresses. Upon receiving a memory access request from a program with a virtual address, table walker 230 performs operations for translating the virtual address into the physical address for the pages where data is located in memory 204.

In some embodiments, table walker 230 (and, more generally, memory management unit 228) uses two mechanisms for performing virtual address to physical address translations. The first of the mechanisms is a hierarchy of page tables that includes a page table associated with each virtual machine and a nested page table associated with the hypervisor. Examples of the page tables are shown in FIG. 2 as guest page table 232 and nested page table 234, which are associated with a virtual machine and hypervisor, respectively. Each page table is a data structure (e.g., one or more tables, an array, a list, etc.) that is stored in memory 204. For example, a guest page table 232 may be stored in a memory region, such as reserved memory region 236 that is allocated for the exclusive access of a corresponding virtual machine (reserved memory region 236 is shown using a dashed line in FIG. 2). In some embodiments, a given page table stores at least one translation for each page present in memory 204 that was stored in memory 204 by a corresponding program, virtual machine, etc. Thus, in these embodiments, if a page has been copied from mass storage 206 to memory 204 or newly created in memory 204 and remains available in memory 204, an associated virtual address to physical address translation should exist in a corresponding page table. As described above, table walker 230 uses guest page table 232 and nested page table 234 to perform virtual address to physical address translations.

The second of the mechanisms for performing virtual address to physical address translations is translation lookaside buffers 238-240 (TLB 238-240), which are caches in each of core 214-216 that are configured to store/cache virtual address to physical address translation information acquired during page table walks. Cores 214-216 acquire virtual address to physical address translation information from the corresponding TLB 238-240, when possible, to avoid performing a page table walk.

Computing device 200 includes reverse map table 242 stored in memory 204. Reverse map table 242 is a data structure (e.g., a table, a list, etc.) that includes a number of entries, one entry for each page of memory in memory 204 that may be allocated for the use of one or more virtual machines. For example, if a memory 204 includes 32 GB of memory that may be allocated in 4 kB pages to virtual machines, reverse map table includes 8,388,608 entries. Reverse map table 242 is used by the hypervisor and other entities for keeping records that include information indicating guest physical addresses that are associated with system physical addresses, of the permissions levels for accessing virtual machines, of validations of pages by virtual machines, of immutable pages, and/or of other information associated with corresponding pages. In this way, computing device 200 maintains a record that can be used to detect when changes are made to the nested page table and otherwise protect pages of memory from impermissible accesses by virtual machines and/or IO devices. Reverse map table 242 is described in more detail below.

In some embodiments, the hypervisor is prevented from directly accessing reverse map table 242. For example, reverse map table 242 may be stored in memory region(s) to which the hypervisor does not have direct access and/or may be marked as immutable in reverse map table 242 (i.e., the page(s) in which reverse map table 242 is stored in memory may themselves be marked as immutable). As another example, reverse map table 242 may be encrypted into a form that is not directly decryptable by the hypervisor. In some embodiments, reverse map table 242 is stored in a region of memory that is not directly accessible to the hypervisor and encrypted. Although no "direct" access is permitted to reverse map table 242 by the hypervisor, the hypervisor may cause other elements or entities in computing device 200 (such as processors, etc.) to perform operations on the tables and using the information in tables. For example, dedicated instructions may be supported that enable the hypervisor (and other entities) to cause computing device 200 to update or adjust entries in reverse map table 242. Such operations are described below.

Input-output (IO) devices 208-210 are devices or functional blocks that perform, in the course of corresponding device operations, accesses (e.g., reads, writes, copies, invalidations, etc.) of data and/or instructions in memory 204. For example, IO devices 208-210 may include network interface devices, disk controllers, devices coupled to corresponding wired or wireless buses or interfaces (e.g., a Peripheral Controller Interface Express (PCIe) bus, a Universal Serial Bus (USB), a WiFi device, etc.), GPUs, etc. The particular operations performed by each of IO devices 208-210 depends on the nature of each IO device. For example, assuming that IO device 208 is a disk controller, IO device 208 may retrieve data from a disk (such as mass storage 206) and write data into memory 204 or vice versa. As another example, assuming that IO device 210 is a network interface device, IO device 210 may store data received via a network in memory 204 or acquire data from memory 204 to be transmitted in a packet, data unit, etc. to a receiving device over the network. As another example, assuming that IO device 210 is a GPU, IO device 210 may perform operations for rendering graphics or other information for display and/or may perform general-purpose computing operations (e.g., matrix processing operations, operations off-loaded from one of cores 214-216, etc.).

IO hub 212 is an input-output hub that performs operations for interfacing between IO devices (e.g., IO devices 208-210) and other functional blocks in computing device 200 (e.g., processor 202). For example, in some embodiments, input-output memory management unit (IOMMU) 244 in IO hub 212 performs operations to enable IO devices to access memory 204. In these embodiments, when data and instructions are to be accessed by an IO device in memory 204 (i.e., read, written, checked/verified, deleted, invalidated, etc.), the IO device sends a memory access request (e.g., a direct memory access request or DMA) to IOMMU 244. IOMMU 244 then sends a corresponding request to memory 204 for satisfaction/resolution of the memory access request. For example, if data is to be retrieved based on the memory access request, IOMMU 244 may acquire the data from memory 204 (or mass storage 206, should the data not be present in memory 204) and forward the data to the requesting IO device.

In some embodiments, and as described above, IO devices use the virtual memory technique for addressing memory. IOMMU 244 therefore includes mechanisms for enabling IO devices to access memory using the virtual memory technique. Input-output table walker (IOTW or IO table walker) 246 is one such mechanism. IO table walker 246 is a functional block that performs operations relating to acquiring address translations from page tables (e.g., page table walks, etc.). IO table walker 246 uses a hierarchy of page tables that includes a page table associated with IOMMU 244 and the nested page table associated with the hypervisor. Examples of the page tables are shown in FIG. 2 as input-output (IO) page table 248 and nested page table 234, which are associated with IOMMU 244 and the hypervisor, respectively. IO page table 248 is a data structure (e.g., one or more tables, an array, a list, etc.) that is stored in memory 204. For example, IO page table 248 may be stored in a protected/encrypted area of memory that is inaccessible to the hypervisor (and other entities in computing device 200). In some embodiments, IO page table 248 stores at least one translation for each page present in memory 204 that was stored in memory 204 by or otherwise accessed by an IO device. As described above, IO table walker 246 uses IO page table 248 and nested page table 234 to perform virtual address to physical address translations.

IOMMU 244 also includes translation lookaside buffer 250 (TLB 250), which is a cache in IOMMU 244 that is configured to store/cache virtual address to physical address translation information acquired during page table walks. IOMMU 244 acquires virtual address to physical address translation information from the corresponding TLB, when possible, to avoid performing a page table walk. In some embodiments, IO devices, such as IO device 208, include local TLBs, such as IOTLB 252, which can be used by the IO devices alone or in combination with TLB 250 in IOMMU 244 to store virtual address to physical address translation information.

In some embodiments, IO devices 208-210 can be provided access to pages of memory allocated to virtual machines—i.e., to pages of memory that are reserved for the exclusive use of particular virtual machines, which can be called "private" pages of memory. For example, and continuing the example of IO device 208 being a disk controller, IO device 208 may perform a direct memory access (DMA) operation to write data in a page of memory that is allocated to a particular virtual machine. In these embodiments, IOMMU 244 and/or IO devices 208-210 perform operations to ensure that accesses of pages owned by virtual machines are permissible and to otherwise enable the accesses. For example, IO table walker 246, when translating virtual addresses to physical addresses, checks reverse map table 242 to ensure that accesses by IO devices are permissible, as described herein. As another example, in embodiments where pages owned by virtual machines are encrypted, IOMMU 244 and/or IO devices 208-210 use corresponding keys, etc. to encrypt and decrypt information retrieved from or destined for the pages.

In some embodiments, communication paths are coupled between the various functional blocks in computing device 200 (processor cores 214-216, memory management unit 228, memory 204, etc.), as shown by arrow-headed lines between the elements. Communication paths include one or more busses, wires, guides, and/or other connections possibly along with controllers, fabric elements (switches, routers, etc.), circuit elements, etc. The communication paths are used to route commands, data, control signals, and/or other information between the functional blocks. For example, in some embodiments, a coherent bus fabric is coupled between IO hub 212, processor 202 (e.g., MMU 228), and memory 204. Note that some communication paths are not shown in FIG. 2 to avoid clutter.

Although embodiments are described with a particular arrangement of cores, some embodiments include a different number and/or arrangement of cores. For example, some embodiments have only one core, while other embodiments have five, eight, or another number of cores. Generally, the described embodiments can use any arrangement of cores that can perform the operations herein described.

Although embodiments are described with a particular arrangement of caches, some embodiments include a different number and/or arrangement of caches. For example, some or all of the caches (e.g., L1 cache 218-220, etc.) may be divided into separate instruction and data caches. Additionally, L2 cache 222 may not be shared, and hence may only be used by a single core (i.e., there may be two L2 caches in processor 202). As another example, some embodiments include different levels of caches, from only one level of cache to multiple levels of caches, and these caches may be located in processor 202 and/or external to processor 202. Generally, the described embodiments can use any arrangement of caches that can be used to perform the operations herein described.

Although computing device 200 and processor 202 are simplified for illustrative purposes in FIG. 2, in some embodiments, computing device 200 and/or processor 202 include additional or different elements and mechanisms for performing the operations herein described and other operations. For example, computing device 200 and/or processor 202 may include power controllers, batteries, media processors, input-output mechanisms, communication mechanisms, networking mechanisms, display mechanisms, etc.

Processor 202, memory 204, mass storage 206, and IO devices 208-210 are some examples of "hardware" that may be represented by computing device hardware 110 and IO device hardware 114 in FIG. 1. In some embodiments, therefore, host operating system 108, IOMMU 112, and/or hypervisor 106 interface between processor 202, memory 204, mass storage 206, and IO devices 208-210 and virtual machines 100, guest operating systems 102, and programs 104. In these embodiments, computing device 200 (e.g., cores 214-216, etc.) executes hypervisor 106, virtual machines 100, guest operating systems 102, and programs 104, as well as host operating system 108, in embodiments in which host operating system 108 is present. In addition, references to "the computing device" and elements within the computing device in this description may refer to computing device 200 and the associated elements.

In some embodiments, functional blocks shown separately in FIG. 2 are implemented together. For example, in a "system on a chip" embodiment, some or all of IO hub 212 and IO devices 208-210 are incorporated with processor 202, such as being fabricated on the same integrated circuit chip. In other words, for such embodiments, IO hub 212 and IO devices 208-210 may be integrated with or located in other functional blocks.

Computing device 200 can be, or can be included in, any electronic device that performs computational operations. For example, computing device 200 can be, or can be included in, electronic devices such as desktop computers, laptop computers, wearable computing devices, tablet computers, smart phones, servers, artificial intelligence apparatuses, virtual or augmented reality equipment, network appliances, toys, audio-visual equipment, home appliances, controllers, vehicles, etc., and/or combinations thereof.

Page Table

Figure 3:
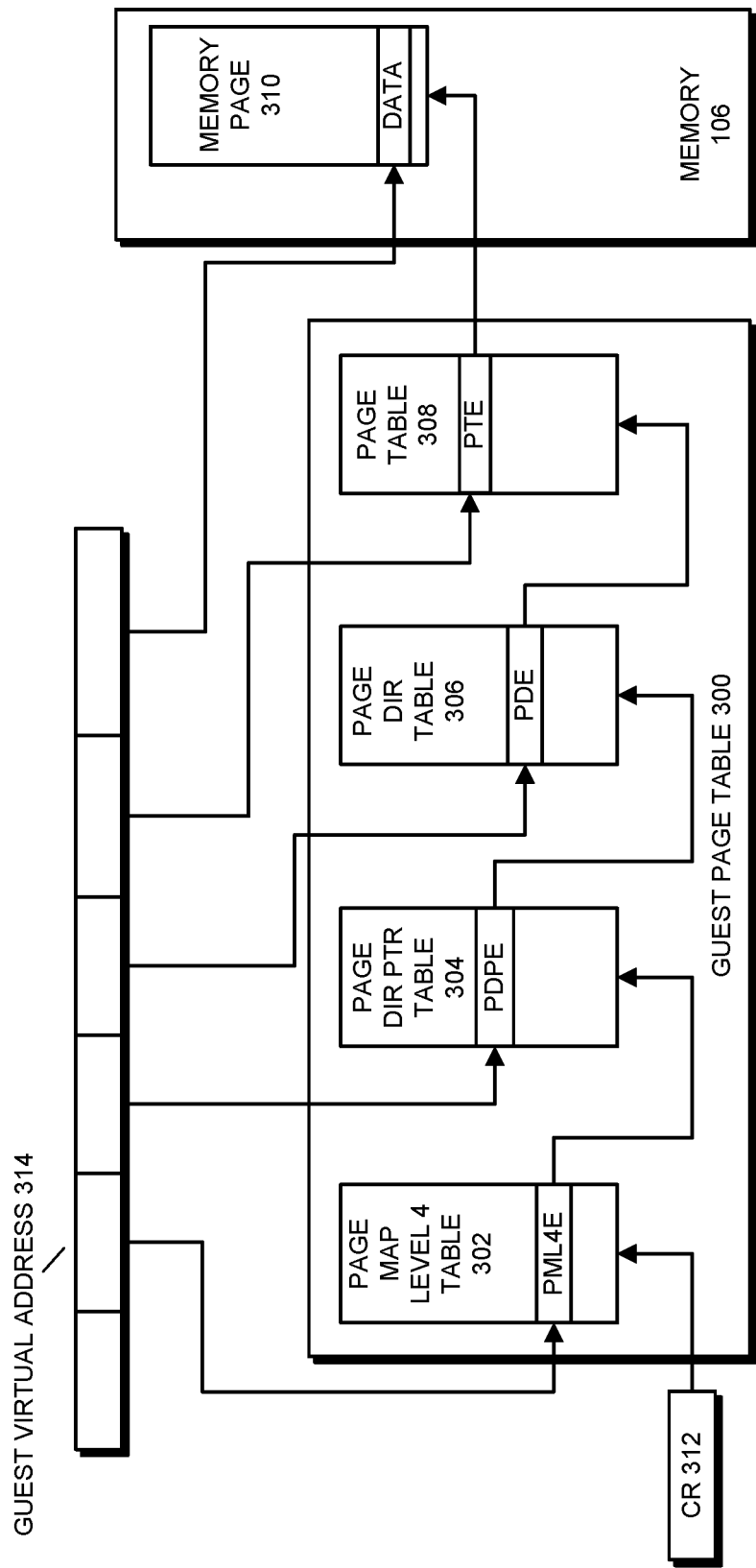
FIG. 3 presents a block diagram illustrating a set of tables used to implement a guest page table in accordance with some embodiments.

As described above, the computing device uses a hierarchy of page tables for performing address translations. FIG. 3 presents a block diagram illustrating a set of tables used to implement a guest page table in accordance with some embodiments. The nested page table or the IO page table can be implemented in a similar way to the arrangement of tables shown in FIG. 3.

As can be seen in FIG. 3, as can be seen in FIG. 3, guest page table 300 includes page map level 4 table 302, page directory pointer table (PAGE DIR PTR TABLE) 304, page directory table (PAGE DIR TABLE) 306, page table 308, and memory page 310. Page map level 4 table 302, page directory pointer table 304, page directory table 306, and page table 308 are data structures (e.g., tables, linked lists, etc.) that are stored in memory. Page map level 4 table 302, page directory pointer table 304, and page directory table 306 each include information about a subsequent table to be searched (or "walked") during a next step of a table walk to find a physical address corresponding to a virtual address 314. For example, page map level 4 table 302 includes a number of entries, each of which includes information mapping corresponding sub-sets of address bits from virtual address 314 to page directory pointer tables (such as page directory pointer table 304, as shown in FIG. 3). Guest page table 300 includes physical addresses indicating particular memory pages associated with corresponding portions of virtual addresses. Memory page 310 is a specific page in memory where data indicated by virtual address 314 is located.

In some embodiments, when performing a table walk in guest page table 300 to acquire a physical address that is associated with virtual address 314, a table walker reads control register (CR) 312 to determine a location, in memory, of a page map level table associated with the corresponding virtual machine (e.g., page map level 4 table 302). The table walker then searches (or walks) the page map level 4 table 302 using a sub-set of the bits from virtual address 314 (e.g., bits 39-47 of a 64-bit virtual address) for an entry (PML4E) indicating a location of a page directory pointer table to be walked next (e.g., page directory pointer table 304). The table walker next proceeds through the remaining tables, i.e., the page directory pointer table 304, a page directory table (e.g., page directory table 306), and a page table (e.g., page table 308), using corresponding subsets of bits from virtual address 314 to walk each table and locate an entry in the table (PDPE and PDE) that indicates a next table to be walked. Eventually, using a physical address acquired from the page table 308 (a page table entry or PTE), the table walker arrives at a particular memory page (e.g., memory page 310). Using a corresponding portion of bits of virtual address 314 (e.g., bits 0-11 of the 64-bit virtual address), the table walker determines an entry (DATA) in the memory page 310 that includes data indicated by virtual address 314. If the table walker is unable to find an address translation for virtual address 314, an error-handling operation is performed (e.g., a page fault is emitted and subsequently processed, etc.).

As described herein, address translation information may be legitimately and properly modified/changed, updated, etc. after being added to page tables. For example, when a page is moved from a first location to a second location in memory, re-assigned from a first virtual machine to a second virtual machine, etc., one or more tables in the set of tables can be updated accordingly. The hypervisor may, however, improperly (maliciously, erroneously, etc.) update an address mapping in a page table, such as by writing incorrect information or old/outdated information in one or more tables in the set of tables. The described embodiments use the reverse map table to avoid using such improperly updated information from page tables. In other words, the described embodiments enforce rules such as each page in memory is only permitted to be associated with a single/unique guest physical address (no guest physical address aliasing is allowed), in-use private guest pages cannot be remapped without involving/informing the corresponding virtual machine, immutable pages cannot be written to by the hypervisor, pages without corresponding validated reverse map table entries cannot be used, and/or other software entities executing on cores 214-216, as described herein.

Although a particular arrangement of tables is shown in FIG. 3, in some embodiments a different number and/or arrangement of tables is used. For example, in some embodiments, only a single table is used, the single table mapping virtual addresses to physical addresses (or, e.g., virtual addresses to guest physical addresses, etc.).

Reverse Map Table

As described above, reverse map table 242 includes information that is used, among other things, to determine whether a table walk of nested page table 234 for a guest physical address returns a system physical address that matches a previously-used system physical address. FIG. 4 presents a block diagram illustrating an expanded view of reverse map table 242 in accordance with some embodiments. Although reverse map table 242 is shown in FIG. 4 as including particular information, in some embodiments, a different arrangement or type of information may be present. Generally, the entries 400 in reverse map table 242 include sufficient information to perform the operations herein described.

As can be seen in FIG. 4, reverse map table 242 includes a number of entries 400 (an entry 400 is highlighted using a dashed line in FIG. 4). Each entry in reverse map table 242 includes information about a corresponding page in memory 204 (e.g., each 4 kB or 2 MB page in memory that may be allocated for use by one or more virtual machines). The entries in reverse map table 242 are indexed using system physical addresses associated with each page, so that each entry is associated with a particular system physical address. For example, for 4 kB pages, a first entry in reverse map table 242 may be associated with a first or lowest allocatable system physical address (address A), a second entry may be associated with a second allocatable system physical address (address A+4 kB), and so forth. In this way, when a particular system physical address is to be looked up in reverse map table 242, an entry at a corresponding offset in reverse map table 242 may be looked up. In some embodiments, a base address of reverse map table 242 is recorded in a specified, and possibly secure, location in computing device 200 to enable the offset-based lookups.

In reverse map table 242, each entry 400 is configured to store global shared pages indicator (GSP) 402, guest identifier (GUEST ID) 404, guest physical address (GUEST PHY ADDR) 406, sub-page count 408, size indicator 410, assigned indicator 412, lock indicator 414, immutable indicator (IMMT) 416, validated indicator 418, and virtual machine permissions level (VMPL) block 420.

Global shared pages indicator 402 is an indicator of whether the corresponding page is shared by two or more virtual machines. Generally, when a page is shared, that page may be accessed (typically read-only) by two or more virtual machines. Shared pages are described in more detail below.

Guest identifier 404 is an identifier associated with a virtual machine to which the corresponding page is allocated. For example, when the corresponding page is allocated for the use of a particular virtual machine, an identifier for the particular virtual machine is recorded in guest identifier 404. Guest identifier 404 may hold an address space identifier (ASID), an ID string, a name, and/or another value that identifies a virtual machine—or that identifies the page as being allocated to a hypervisor, shared among multiple virtual machines, or otherwise allocated.

Guest physical address 406 is a value that represents a guest physical address that is associated with the system physical address for the entry. For example, when a page at a given system physical address is allocated for the use of a virtual machine, assigned to the virtual machine, etc., the guest physical address to be used by the virtual machine for addressing the page is recorded in the corresponding entry 400 in reverse map table 242. In this way, a record is made of the particular guest physical address to be used by the virtual machine for which each page is allocated. As described below, recording this information enables a table walker (e.g., table walker 230 or IO table walker 246) to determine, when checking a system physical address acquired during a walk of the nested page table, whether the system physical address maps to the expected guest physical address, i.e., whether the system physical address has been mapped to two different guest physical addresses at the same time. This can enable detecting whether the mapping has been changed maliciously or erroneously by a hypervisor or another entity.

Sub-page count 408 is a count of smaller-sized pages allocated for virtual machine(s) within a larger-sized page. For example, in a system that supports 2 MB pages and 4 kB pages, a page on a 2 MB boundary (e.g., pages at addresses A, A+2 MB, A+4 MB, etc.) can have a count of 4 kB pages within the 2 MB page that have been allocated for use by a virtual machine. The sub-page count value can be used to determine whether an access to a larger-sized page is impermissible given that smaller pages have been allocated within the larger-sized page. In other words, sub-page count 408 can be used to avoid an impermissible access to the corresponding page using an improper page size.

Size indicator 410 is an expected size for an access of a corresponding page. For example, assuming 4 kB pages and 2 MB pages are used in computing device 200, size indicator 410 can indicate which size of an access is associated with the corresponding page. Size indicator 410 enables detection of impermissibly-sized accesses such as a 2 MB access of what is actually a 4 kB page or vice versa.

Assigned indicator 412 is an indicator of whether the entry 400 is currently assigned to one or more virtual machines. Assigned indicator 412 is used to prevent the use of information from entries 400 in reverse map table 242 that are not presently allocated, but may still contain old information (undeleted information, random bit patterns, etc.), that are initialized, but do not contain actual information, etc. In some embodiments, assigned indicator 412 is set when a page is currently allocated to a virtual machine and is unset/cleared when the page is deallocated from the virtual machine.

Lock indicator 414 is an indicator of whether the entry 400 is locked. When lock indicator 414 is set, the entry 400 is considered to be locked, and when lock indicator 414 is unset/cleared, the entry 400 is considered to be free or available. Once the entry 400 has been locked by a given hardware or software entity, other hardware and software entities in computing device 200 are prevented from accessing the entry 400 (e.g., reading, writing/updating, etc. the entry 400). In contrast, any hardware and software entity can be permitted to access a free/available entry (possibly after setting lock indicator 414). For example, in an embodiment where lock indicator 414 is a single bit and is initially clear (e.g., set to zero), an entity may set lock indicator 414 (e.g., to 1), access the entry 400 one or more times, and then clear lock indicator 414 when finished accessing the entry 400. Using lock indicator 414, the described embodiments can avoid race conditions and other conditions where simultaneous reads and/or writes may occur for the entry 400.

Immutable indicator 416 is an indicator of whether the corresponding page is immutable. When a page is marked as immutable using the corresponding immutable indicator 416, the page cannot be written to by a software entity (e.g., hypervisor, guest operating system, application program, etc.) that is executing on a core (e.g., cores 214-216). In other words, an immutable page is prevented from being wholly or partially rewritten, updated, or amended, added to or removed from, etc. by any of the software entities. In addition, immutable pages are to be deallocated by a platform security processor (e.g., platform security processor 226), and cannot be deallocated by a core, including a core acting on behalf of or under the control of a software entity executing thereon (e.g., a hypervisor, etc.). Immutable pages are described in more detail in U.S. patent application Ser. No. 15/417,632, which is, as described above, incorporated by reference herein.

Validated indicator 418 is an indicator of whether entry 400 has been validated by a virtual machine (i.e., a virtual machine to which a corresponding page is allocated). The virtual machine updates validated indicator 418 (e.g., sets one or more bits of validated indicator 418 to a specified value such as 1) to indicate that entry 400 is validated, thereby "marking" entry 400 as validated. For example, the virtual machine may immediately validate corresponding entries in reverse map table 242 upon being allocated pages, or may delay validation, such as validating entries when initially accessing pages or upon receiving validation faults for the pages. In some embodiments, the virtual machine executes a dedicated instruction to perform the validating/update validated indicator 418. Validated indicator 418 is cleared when entry 400 is updated, such as when a hypervisor changes information in entry 400. During operation, the table walker determines, based on the set/cleared state of validated indicator 418, whether or not the virtual machine has validated entry 400.

Virtual machine permissions level (VMPL) block 420 includes sets of permissions for a number of permissions levels for the page associated with entry 400. In some embodiments, computing device 200 supports two or more permissions levels, each permissions level being associated with permissions (e.g., enabled/disabled, permitted/not permitted, etc.) for a specified set of operation types for pages in memory. The operation types can include any operation that may be performed on data in a page or with a page, such as reads of data, writes of data, execution of program code in pages, etc. For a given page, the set of permissions for each of the permissions levels may be different, so that a given operation type in a first permissions level may have a different permission than the same operation type in a second permissions level. For example, writes of data may be permitted in the first permissions level for a page, but not in the second permissions level. In some embodiments, the permissions levels are organized in a hierarchy, with "higher" permissions levels having more permissions than "lower" permissions levels.

FIG. 5 presents a block diagram illustrating an expanded view of virtual machine permissions level block 420 in accordance with some embodiments. In some embodiments, information such as that shown in FIG. 5 is incorporated into virtual machine permissions level block 420, such as being included in a number of bytes appended to or otherwise included with the other information in an entry 400 (i.e., global shared pages indicator 402, guest ID 404, etc.). Although a particular arrangement of permissions indicators is shown in FIG. 5, in some embodiments, different permissions information is included in virtual machine permissions block 420. For example, a different number of permissions levels may be supported, from two permissions levels to multiple permissions levels (as shown by the ellipsis in FIG. 5), or a different number or type of permissions may be included in each permissions level.

As shown in FIG. 5, the illustrated embodiments support N permissions levels 500-506 (which are shown separated by shaded segments for readability). Each permissions level includes a set of permissions having a number of permissions indicators. For example, the permissions indicators in each set of permissions may be individual bits that form a permissions "mask" for that level (i.e., a bit string or sequence). Within the set of permissions for each permissions level in FIG. 5 is a permissions indicator for read (R), write (W), execute-user (EU) (an indication of whether a virtual machine with "user" type access is/is not permitted to execute program code from a corresponding page), and execute-administrator (EA) operation types. It is possible, therefore, to separately indicate whether or not each of these operation types are permitted for each of permissions levels 500-506.

During operation, entities in the computing device may update the set of permissions/permissions mask for some or all of levels 500-506. For example, an operating system and/or another software entity or a hardware entity (e.g., platform security processor 226) may update a permissions mask at startup, when one or more events occurs (e.g., software program changes, operating state changes, user changes, etc.), at a specified interval, etc. When a given permissions mask is updated, some or all of the individual bit(s) of the given permissions mask are changed/overwritten. When subsequently checking the corresponding entry 400 in reverse map table 242, the table walker determines, based on the state of a respective bit in the set of permissions in a permissions level, whether a virtual machine having that permissions level is permitted to perform a requested operation type on the corresponding page.

Reverse Map Table Initialization

Figure 6:
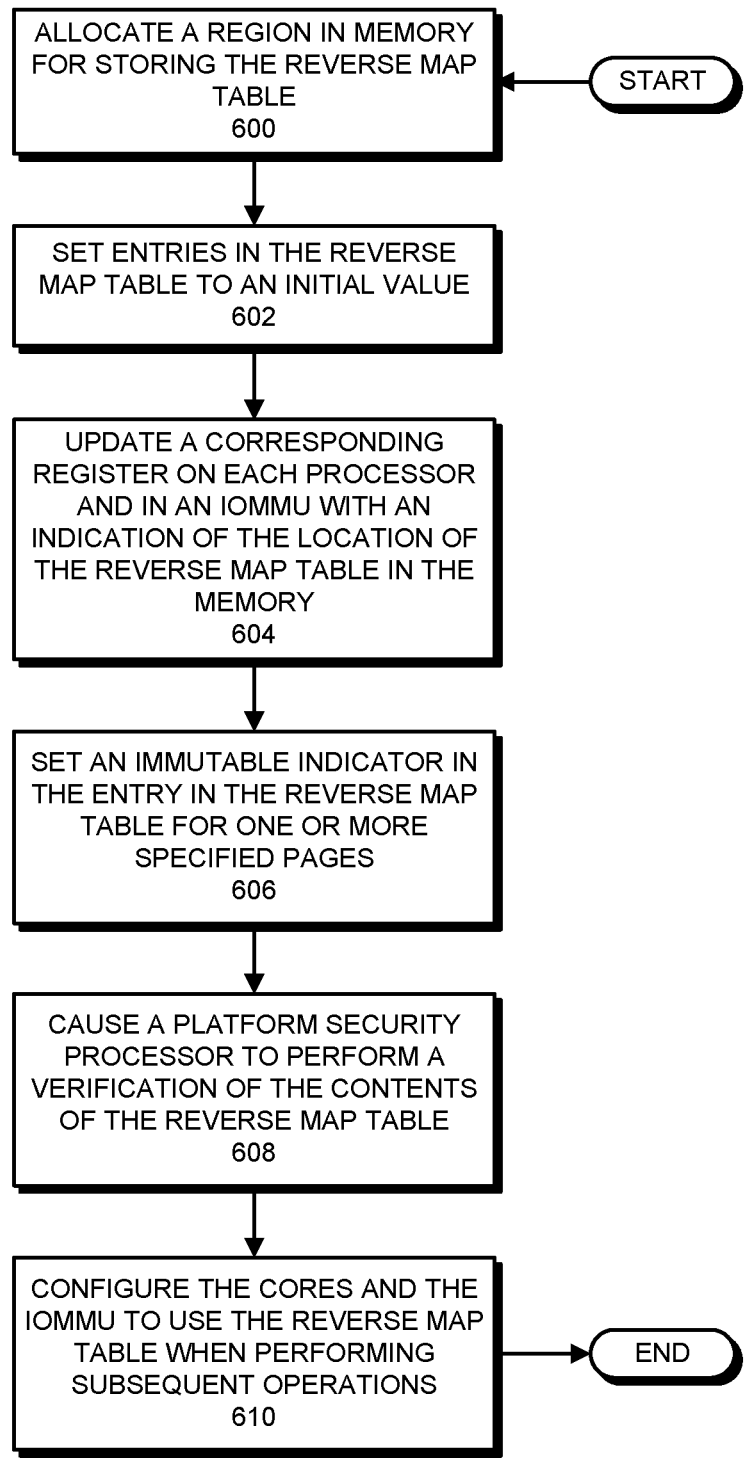
FIG. 6 presents a flowchart illustrating a process for initializing a reverse map table in accordance with some embodiments.

In some embodiments, as the computing device is being initialized (e.g., during a boot-up operation), reverse map table 242 is initialized. FIG. 6 presents a flowchart illustrating a process for initializing reverse map table 242 in accordance with some embodiments. The operations shown in FIG. 6 are presented as a general example of operations performed by some embodiments. The operations performed by other embodiments include different operations and/or operations that are performed in a different order. Additionally, although certain mechanisms/elements are used in describing the operations (e.g., a platform security processor, etc.), in some embodiments, other mechanisms perform the operations and/or the operations are performed on other mechanisms/elements.

The process shown in FIG. 6 starts when a software entity (e.g., an operating system, a hypervisor, etc.) allocates a region in memory for storing reverse map table 242 (step 600). For example, the software entity may perform one or more operations for finding and reserving, for reverse map table 242, a block or portion of the memory of a specified size. Note that, in some embodiments, and as described below, the size of the reverse map table depends on whether or not virtual machine permissions levels are enabled, with the reverse map table using more space (in terms of bytes used for storing the reverse map table in memory) when space for the virtual machine permissions level information is to be allocated in the reverse map table.

The software entity then sets entries in reverse map table 242 to an initial value (step 602). For example, the software entity may write zeros to each entry in reverse map table 242 in the allocated region in the memory. By setting the entries in this way, the software entity ensures that reverse map table 242 does not initially include information that may affect subsequent operations that depend on reverse map table 242. During this operation, in other words, the software entity creates reverse map table 242 in memory containing only the initial values.

The software entity next updates a corresponding register (or other memory location) on each core (e.g., cores 214-216) and on an IOMMU (e.g., IOMMU 224) with an indication of the location (e.g., starting address and the size) of reverse map table 242 in the memory (step 604). In some embodiments, the register (or other memory location) is secured against updates during the subsequent operation of the computing device. For example, a dedicated register such as a machine state register (e.g., a register having a lock bit, etc.) in each core may be used to hold the indication of the location of reverse map table 242.

The software entity then sets an immutable indicator in a reverse map table entry for one or more specified pages (step 606). For example, the immutable indicator may be set (e.g., to 1 or another value) for entries associated with page(s) where reverse map table 242 itself is stored in the memory, for page(s) where virtual machine register state is to be stored, etc. During this operation, the software entity may execute one or more RMT_UPDATE requests to cause the setting of the specified immutable indicators in reverse map table 242. Recall that setting the immutable indicators as described prevents software entities (including the hypervisor, etc.) from subsequently updating the corresponding pages.

The software entity next causes the platform security processor to perform a verification of the contents of the entries in reverse map table (step 608). For example, the software entity may, at some point after initializing reverse map table 242, invoke an INIT function of the platform security processor, which causes the platform security processor to check reverse map table 242 to verify that the immutable indicator is set in the entries for the specified pages and that other entries in reverse map table 242 (i.e., aside from the entries for the specified pages) contain the initial value. If so, the platform security processor may complete the INIT operation without performing a remedial action, thereby freeing reverse map table 242 for use as herein described. Otherwise, the platform security processor may perform a remedial action (e.g., assert a fault or error, prevent guest operating systems from starting, etc.) when one or more entries are set to incorrect initial values. In this way, the platform security processor ensures that reverse map table 242 is in a correct state before allowing use of reverse map table 242.

The platform security processor (or another entity) then configures the cores and the IOMMU to use the reverse map table when performing subsequent operations (step 610). For example, the platform security processor can write a specified value (e.g., 1 or another value) to a dedicated register in each of the cores and the IOMMU. The cores and the IOMMU, based on the specified value being stored in the register, perform the checks and other operations herein described using the reverse map table. Note that, in some embodiments, when not configured as described (e.g., if the reverse map table initialization fails), the cores and/or the IOMMU are not set up to perform the checks and other operations using the reverse map table—and the computing device may perform corresponding remedial actions. For example, the computing device may retry the reverse map table initialization, proceed without reverse map table checks and other operations, block or alter one or more operations that depend on the reverse map table, process a fault, terminate a startup sequence, etc.

In some embodiments, the platform security processor has other duties in addition to the above described checks on initialization of reverse map table 242. For example, in some embodiments, the platform security processor performs operations (e.g., encryption, packaging, etc.) relating to migrating pages between guest operating systems (or virtual machines) and transferring the state of the corresponding entries in reverse map table 242. As another example, in some embodiments, the platform security processor is responsible for deallocating pages that are marked as immutable—and may be the only entity that is permitted to deallocate such pages.

Updating the Reverse Map Table

Figure 7:
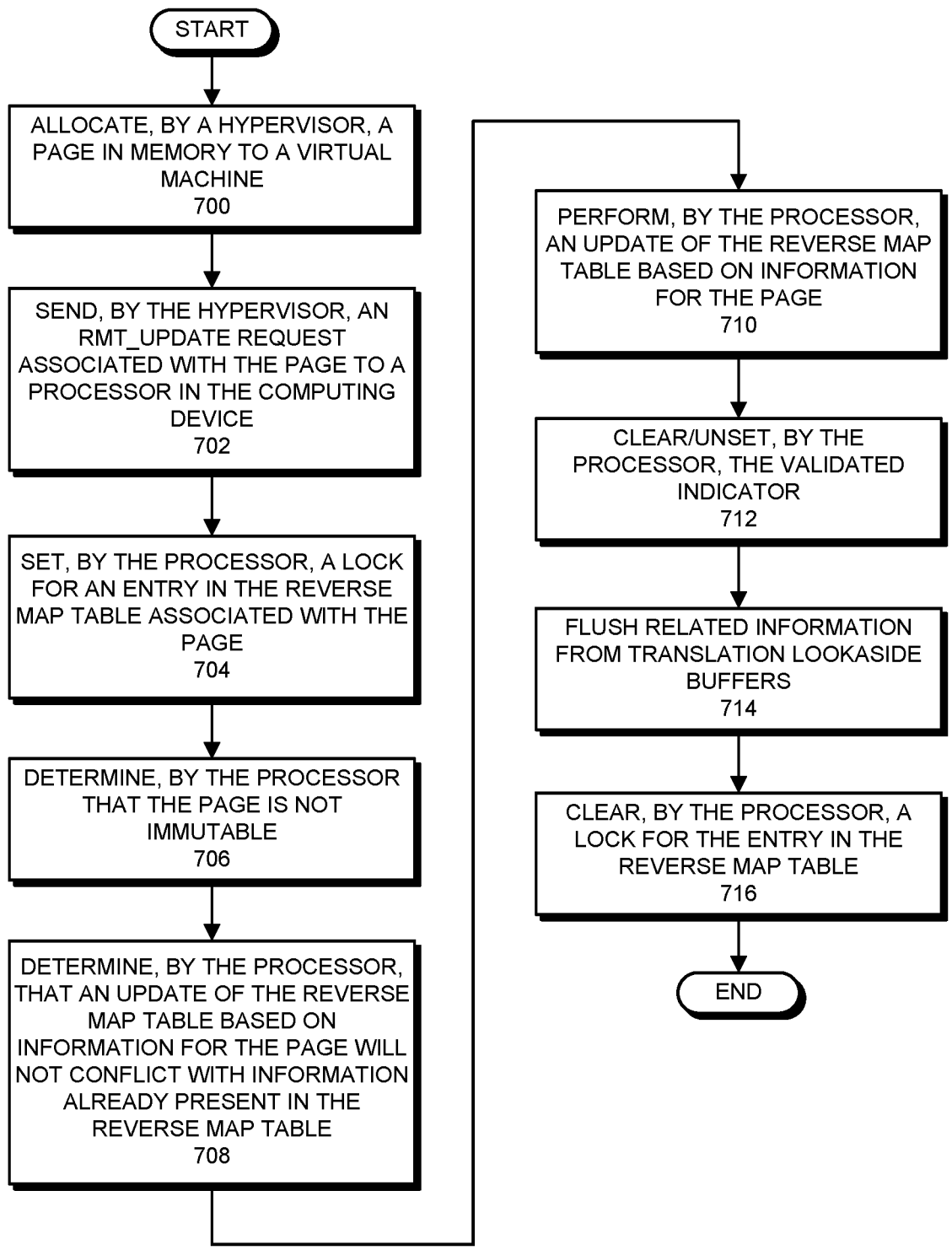
FIG. 7 presents a flowchart diagram illustrating a process for updating a reverse map table in accordance with some embodiments.

FIG. 7 presents a flowchart illustrating a process for updating reverse map table 242 in accordance with some embodiments. The operations shown in FIG. 7 are presented as a general example of operations performed by some embodiments. The operations performed by other embodiments include different operations and/or operations that are performed in a different order. Additionally, although certain mechanisms/elements are used in describing the operations (e.g., a hypervisor, etc.), in some embodiments, other mechanisms perform the operations and/or the operations are performed on other mechanisms/elements.

An example is provided in FIG. 7 in which a hypervisor updates, using an RMT_UPDATE request, an entry in the reverse map table. Generally, when updating the reverse map table, the processor in the computing device follows similar steps to those shown in FIG. 7, e.g., steps 702-716. Although the update operation is described as being associated with the allocation of a corresponding page, the update operation is not limited to being used only when pages are allocated. Generally, the update operation can be performed any time that an entry in the reverse map table is to be updated. In other words, the operations of steps 702-716 may be performed when updating an entry in the reverse map table for a reason other than allocation of the corresponding page, such as deallocation of the page, updates of page properties, etc. This is illustrated in FIG. 7 using step 718, which presents a decision block for subsequent updates for the reverse map table.

The process shown in FIG. 7 starts when a hypervisor in a computing device allocates, to a virtual machine, a page in memory (step 700). For example, the hypervisor may allocate a particular page along with other pages in a region of memory when allocating the region of memory for the use of the virtual machine. The allocation may be performed when the virtual machine is newly initialized, during operation of the virtual machine as the virtual machine requests the allocation or creation of one or more pages, etc. During the allocation, the hypervisor may also update the nested page table with corresponding guest physical address to system physical address information.

Upon allocating the page, the hypervisor sends, to a processor in the computing device, an RMT_UPDATE request associated with the page (step 702). When sending the RMT_UPDATE request to the processor, the hypervisor may execute a corresponding instruction (e.g., a dedicated RMT_UPDATE instruction, etc.), access a particular register (e.g., a model-specific register, etc.), and/or use another mechanism. The RMT_UPDATE request causes the processor to perform operations for updating an entry in reverse map table 242 associated with the page of memory. In some embodiments, the RMT_UPDATE request includes sufficient information to enable the updating of the entry in reverse map table 242 without acquiring information from other sources (e.g., from the virtual machine, etc.). For example, the RMT_UPDATE request may include a system physical address where the page is located, a guest physical address to be used by the virtual machine for addressing the page, an identifier for the virtual machine, a page size, an indication of whether the page is shared, a request to mark the page as immutable, a request to lock the entry in reverse map table 242, permissions level information, and/or other information. In other embodiments, the processor acquires some or all of the information from another source. For example, before or while making the RMT_UPDATE request, the hypervisor and/or the virtual machine may write information about the page into a specified memory element (e.g., memory 204, a dedicated register, etc.) and the processor may read the memory element to acquire the information. As another example, the processor may request information from hypervisor and/or the virtual machine.

The processor then sets a lock for the entry in reverse map table 242 (step 704). During this operation, the processor sets the lock indicator in the entry to a value that indicates that the entry is locked, e.g., a 1 or another value. By setting the lock indicator in this way, the processor configures the entry so that no other hardware or software entity can update or otherwise modify the entry. In this way, the contemporaneous and possibly erroneous modification of the entry by two or more entities can be avoided, such as when an update race condition occurs between the entities.

The processor next determines that the page is not immutable (step 706). During this operation, the processor acquires the value of the immutable indicator from the entry in reverse map table 242 and determines whether the immutable indicator is set to a value that indicates that the page is immutable. For this example, it is assumed that the page is not immutable, and therefore can be written to as described above. If the entry was immutable, the processor would release the lock for the entry (e.g., set the lock indicator to 0) and fail the RMT_UPDATE operation, which may involve performing a remedial action.

The processor then determines that an update of the entry in reverse map table 228 based on the information for the page will not conflict with information already present in the reverse map table (step 708). For example, the processor may compare the size of the page to page sizes in one or more other entries to ensure that the information for the page does not describe a page that overlaps with one or more existing pages. For instance, the processor determines that information about a smaller page (e.g., 4 kB) will not to be written to an entry in reverse map table 228 for which the system physical address falls within a set of system physical addresses in use for a larger page (e.g., 2 MB) at another location in reverse map table 228. In other words, the processor determines that a smaller page does not overlap with a larger page or vice versa. If a conflict was detected, the processor may perform a remedial action such as raising a fault, signaling an error to the hypervisor and/or the virtual machine, etc.—and may fail the RMT_UPDATE operation, which may involve performing a remedial action. Generally, the processor, during this operation, compares information from the entry to information from or associated with the RMT_UPDATE request and/or one or more predetermined rules to ensure that it is safe to update the entry.

The processor then performs an update of reverse map table for the page (step 710). During the update of reverse map table 242, the processor writes some or all of the above-described information (i.e., the system physical address, the guest physical address, the identifier for the virtual machine, the page size, permissions level information, etc.) about the page to corresponding fields in the entry of the reverse map table 242. When the update is complete, reverse map table 242 includes sufficient information in the entry for consumers of the information in the computing device (e.g., the table walker, etc.) to determine a guest physical address to which the system physical address for the entry maps, a particular virtual machine that has access to the page, etc. Note that updating the entry in reverse map table 242 may involve updating only a portion/subset of the information in the entry, such as updating particular bit(s) in the entry, or may involve updating all of the information in the entry, such as overwriting the entire entry.

When updating reverse map table 242, the processor clears/unsets the validated indicator for the entry (step 712). For example, the processor can set the validated indicator to 0, thereby marking the entry as having not yet been validated by the corresponding virtual machine. In this way, the processor configures the entry to indicate to consumers of the information that the entry in the reverse map table 242 has been updated. By performing the comparison described herein between the validated indicator and a local record of validated pages kept by the virtual machine (or when the virtual machine knows, without keeping the local record, that certain pages have been validated), clearing/unsetting the validated indicator as described can help to avoid a using incorrect mapping information (and/or other information from the entry) when the entry is unexpectedly changed.

In some embodiments, if the entry was previously valid, i.e., if the updating overwrites information that was already present in the reverse map table 242, the processor flushes related information from TLBs in the computing device (step 714). For example, the processor may cause all entities that include TLBs (other cores, IOMMU, etc.) to simply flush all information from the TLBs, or perform a selective flush of TLB entries that rely on or are otherwise related to (e.g., via guest ID, etc.) the updated entry from reverse map table 242. In this way, the processor removes from the TLBs any stale copies of translation information associated with the entry that is being updated. Such TLB flushes are described in more detail below.

In some embodiments, the processor updates sub-page counts for one or more entries when updating the entry in reverse map table 242. For example, for a given smaller page, the processor finds and updates an entry for one or more larger pages within which the smaller page may reside. For instance, when an entry is updated with information about a 4 kB page, the processor updates information for an entry for a larger page, which itself may not be allocated, to reflect that the region of the larger page includes a smaller page. In this way, the processor adds information to the table for simplifying the determination in step 708 that an update of reverse map table 242 based on the information for the page will not conflict with information already present in the reverse map table. That is, the processor sets the sub-page count so that updates for the entry for a larger page can be stopped using only the information from the sub-page count, without individually checking each corresponding smaller page entry in reverse map table 242.

After completing the update of reverse map table 242, the processor clears the lock for the entry in reverse map table 242 (step 716). During this operation, the processor clears the lock indicator in the entry to a value that indicates that the entry is not locked, e.g., a 0 or another value. By clearing the lock indicator in this way following the update, the processor reconfigures the entry so that other hardware or software entities can acquire the lock to enable updating the entry, reading information from the entry, etc.

During subsequent operation, the hypervisor determines whether the reverse map table entry for the page is to be updated. For example, when the hypervisor assigns the page to a different virtual machine because the corresponding virtual machine is no longer using the page, an update of the guest physical address associated with the existing system physical address is made in reverse map table 242. Upon determining that an update is to be made for the entry, the hypervisor causes steps 702-716 to be performed to update the entry. As described above, during the updating, the processor writes some or all of the above-described information (i.e., the system physical address, the guest physical address, the identifier for the virtual machine, the page size, etc.) about the page to corresponding fields in the entry of the reverse map table. The processor also sets the validated indicator to 0 to indicate that the entry in the reverse map table 242 has been updated. When the mapping for the page is not to be updated (step 718), the process ends.

As shown in FIG. 7, the hypervisor (and other entities) do not have "direct" access to reverse map table 242 for updating entries. Instead, the hypervisor sends the RMT_UPDATE request and the processor handles the update as described above (including clearing the access indicator). By limiting the hypervisor's updating access to the reverse map table 242 to the RMT_UPDATE request as described, the described embodiments avoid the situation where the hypervisor maliciously, erroneously, etc. updates both the nested page table and the reverse map table 242, thereby possibly concealing an update of the nested page table.

In some embodiments, when the hypervisor is to terminate a particular virtual machine, the hypervisor reclaims the pages allocated to the virtual machine and subsequently re-allocates the pages by modifying the nested page table and reverse map table 242. Note that deallocating immutable pages is performed via a platform security processor. The platform security processor may provide an interface to software entities such as the hypervisor to enable the software entities to request the platform security processor to perform the deallocation of the pages.

Validation

In the described embodiments, virtual machines update validation information in the reverse map table prior to accessing corresponding pages in memory, thereby "validating" the entries. By validating the entries, the virtual machines mark the corresponding pages as pages that may be (but are not required to be) accessed by the virtual machines.

In addition to updating validation information in the reverse map table, in some embodiments, virtual machines keep a local record of entries in the reverse map table that have been validated. For example, the local record of validated entries may be stored in a protected and/or encrypted portion of the memory allocated to the virtual machine, such as by storing, in a lookup table, linked list, or other data structure, an identifier for each entry (e.g., system physical address, etc.). When used in combination with the above-described process for updating the reverse map table (i.e., the RMT_UPDATE instruction), which includes clearing validation information in the reverse map table upon updating an entry, the local record of validated entries enables a virtual machine to determine that an update has occurred for a given entry that was previously validated. In other words, a difference between the local record and what is present in the reverse map table can show that the entry in the reverse map table was updated, possibly maliciously and/or erroneously. The virtual machine can then choose to re-validate the entry and use the entry as-is, or can perform one or more remedial actions, including refusing to re-validate the entry and/or use the translation, which can help to avoid using entries that may have been maliciously or erroneously updated.

In some embodiments, the above-described local record of entries in the reverse map table that have been validated is not kept by some or all of the virtual machines. For example, a virtual machine may automatically validate the entries in the reverse map table upon allocation of the corresponding pages. In this case, the virtual machine subsequently assumes that all entries in the reverse map table are validated and handles entries that are not marked as validated as described herein.

Figure 8:
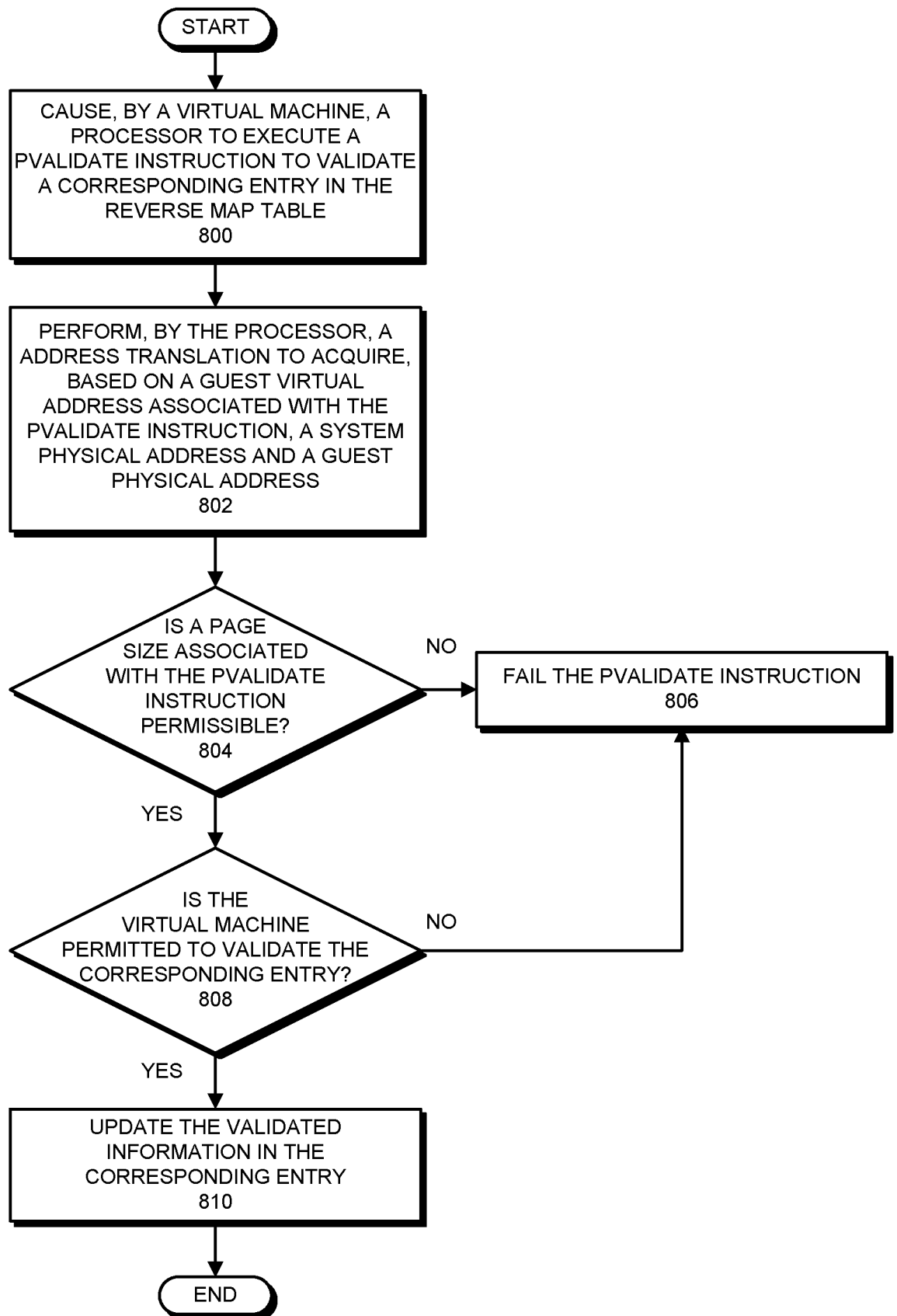
FIG. 8 presents a flowchart illustrating a process for executing a PVALIDATE instruction in accordance with some embodiments.

In some embodiments, a virtual machine executes (or, rather, causes a processor to execute) a dedicated PVALIDATE instruction in order to validate an entry. When executing a PVALIDATE instruction, the processor performs a number of operations that culminate in an update of a validated indicator in a corresponding entry in the reverse map table or a failure/error. FIG. 8 presents a flowchart illustrating a process for executing a PVALIDATE instruction in accordance with some embodiments. The operations shown in FIG. 8 are presented as a general example of operations performed by some embodiments. The operations performed by other embodiments include different operations and/or operations that are performed in a different order. Additionally, although certain mechanisms/elements are used in describing the operations (e.g., a processor, etc.), in some embodiments, other mechanisms perform the operations and/or the operations are performed on other mechanisms/elements. For example, in some embodiments, the operations described as being performed when executing the PVALIDATE instruction are performed without requiring a dedicated instruction. For instance, in these embodiments, the input parameters may be written to reserved memory locations and the processor may, via an interrupt, hardware register (flag) value, or other mechanism, be caused to commence the described operations.

As can be seen in FIG. 8, the process starts when a virtual machine causes a processor to execute a PVALIDATE instruction (step 800). In some embodiments, the PVALIDATE instruction takes, as input parameters, the guest virtual address, a page size (e.g., 4 kB, 2 MB, etc.), and an validate/invalidate indicator, which are used as described below in subsequent operations. Executing the PVALIDATE instruction causes the processor to request a translation from the table walker for the guest virtual address, thereby acquiring the associated guest physical address and the system physical address (step 802).

The processor then checks the page size associated with the PVALIDATE instruction to ensure that the page size is permissible (step 804). Generally, during this operation, the processor checks to ensure that an improper page size is not included with the PVALIDATE instruction in order to avoid validating entries for incorrectly-sized pages. For example, the processor may confirm that the page size is properly aligned on page size boundaries and/or that that the page size in a corresponding entry in the reverse map table matches the page size. If the page-size check fails, the processor fails the PVALIDATE instruction (step 806). "Failing" the PVALIDATE instruction, as used herein, means that the processor halts or terminates further processing of the PVALIDATE instruction and may transmit a failure reason code or assert a specified fault to the requesting virtual machine.

When the page size is permissible, the processor checks various information in the corresponding entry in the reverse map table to determine whether the virtual machine is permitted to update the corresponding entry (step 808). Generally, this operation involves verifying that the virtual machine is permitted to update the validated indicator for the corresponding entry based on the particulars of the virtual machine and the entry itself. For example, the processor may check the lock indicator, the immutable indicator, and may compare values such as the virtual machine's ID to the stored guest ID, the guest physical address to the stored guest physical address, etc. When the virtual machine is not permitted to update the corresponding entry, the processor fails the PVALIDATED instruction (step 806).

When the virtual machine is permitted to update the corresponding entry, the processor updates the corresponding entry (step 810). During this operation, the processor stores, in a validated indicator in the corresponding entry, a value, such as 1, X, or another value, that is designated to represent that the corresponding entry has been validated. In some embodiments, the processor also transmits, to the requesting virtual machine, a success message or value.

In some embodiments, in addition to the other operations in FIG. 8, the processor locks the entry in the reverse map table before performing the checks and the update (i.e., steps 804 and 808-810) using the lock indicator as described herein. In these embodiments, the processor selectively unlocks the entry upon failing the PVALIDATE instruction (i.e., will return the lock to the previous locked/unlocked state) or successfully updating the validated indicator in the corresponding entry.

In some embodiments, upon updating the corresponding entry in step 810, the processor informs the virtual machine whether or not the corresponding entry was changed. For example, when the validated indicator in the corresponding entry was already set to the above described value (1, X, etc.), the processor can set a processor flag to indicate, to the virtual machine (and other software entities) that the update was made to a validated indicator that was already set—i.e., the validated indicator was not changed from one value to another. As another example, when the validated indicator in the corresponding entry was unset/cleared (set to 0, K, etc.), the processor can set the processor flag to indicate, to the virtual machine (and other software entities) that the update was made to a validated indicator that was cleared—i.e., the validated indicator was changed from one value to another.

Although an example of the PVALIDATE instruction is provided in which the requesting virtual machine validates the entry in the reverse map table, operations for invalidating the entry are similar, with the exception of the outcome being that the validated indicator in the corresponding entry is cleared/unset (e.g., set to a specified value such as 0, B, or another value). In some embodiments, in order to invalidate an entry in the reverse map table, the virtual machine requests invalidation in the input parameters of the PVALIDATE instruction.

Virtual Machine Permissions Levels

In some embodiments, two or more permissions levels are used for determining and controlling the operation types that are permitted to be performed by virtual machines. In these embodiments, pages in memory are associated with sets of permissions for each permissions level. Each set of permissions includes permissions for a number of different operation types, such as permitted/not permitted permissions for operation types such as read, write, execute, move, etc. In these embodiments, virtual machines are assigned a particular permissions level from among the permissions levels and therefore have the corresponding permissions for the operation types for pages. For example, a page may be associated with a first permissions level in which read accesses are allowed—and thus a virtual machine that is assigned the first permissions level is permitted read accesses.

In some embodiments, the reverse map table includes, in each entry, a set of permissions associated with each permissions level for a corresponding page. For example, each entry may include a permissions "mask" (e.g., a number of bits) for each permissions level that indicates the permissions (e.g., permitted/not permitted) for a number of operation types. Each set of permissions for a page may be set and updated separately from other sets of permissions for other permissions levels for the page.

In some embodiments, the set of permissions for some or all of the permissions levels for a given entry may be different than the set of permissions for the same permissions levels in other entries. In other words, the permissions levels can be set and updated separately for at least some of the entries in the reverse map table. In this way, the operation types that are allowed for individual pages may be controlled using the associated permissions level information in the reverse map table.

In some embodiments, virtual machines are assigned, and possibly reassigned, permissions levels at specified times. For example, in an embodiment with two permissions levels, a virtual machine may be assigned one of the permissions levels. In these embodiments, a virtual machine may be assigned a permissions level when the virtual machine starts, changes operating state, commences executing particular workloads, etc. The permissions level assigned to the virtual machine is then used for controlling the operation types that are allowed to be performed by the virtual machine for pages in memory as described herein. In some embodiments, each virtual machine is separately assigned a permissions level.

In some embodiments, the sets of permissions in the reverse map table override permissions information available in other places. For example, a page table entry for a particular page may indicate that the page is writeable, but if the set of permissions in a corresponding entry in the reverse map table indicates that writes are not permitted for a given permissions level, the table walker (or other entity) may prevent (via failing translation requests) virtual machines having the given permissions level from performing writes in the page.

In some embodiments, the individual permissions in the sets of permissions in the reverse map table are independent, so that having a particular permission does not grant other permissions. For example, having write permission does not automatically mean that reads are permitted, etc.

In some embodiments, virtual machines are configured hierarchically, with higher level virtual machines in the hierarchy being assigned more-privileged permissions levels than lower level virtual machines. In some of these embodiments, within the hierarchy of virtual machines, sets of permissions can be updated by higher level virtual machines to enable control of operation types that are (and are not) permitted to be performed by lower level virtual machines.

In some embodiments, a given virtual machine can be divided into two or more "sub" virtual machines and the sub virtual machines can be separately assigned permissions levels. For example, particular program code, routines, and/or other portions of the virtual machine may be included in a sub virtual machine, and assigned a given permissions level. In these embodiments, the permissions levels assigned to each sub virtual machine of a given virtual machine may be different. By dividing virtual machines into sub virtual machines and separately assigning permissions levels to the sub virtual machines as described, portions of virtual machines that are considered untrustworthy may be limited by using more restrictive permissions levels. As with the hierarchy of virtual machines described above, in some of these embodiments, sub virtual machines having higher permissions levels can be enabled to update sets of permissions for lower permission level sub virtual machines.

In some embodiments, in order to perform the above-described updates of sets of permissions for other virtual machines/sub virtual machines, higher permission level virtual machines/sub virtual machines update reverse map table. Such updates, however, are limited to being made for sets of permissions for permissions levels lower than a permissions level of the updating virtual machines/sub virtual machines—and may be restricted in other ways, such as only being permissible for pages that are assigned to a particular virtual machine, etc. In these embodiments, a sub virtual machine having a highest or most permissive permissions level may be allowed to update sets of permissions for one or more (and perhaps all) lower permissions levels in entries in the reverse map table that are assigned to a corresponding virtual machine. In other words, a virtual machine/sub virtual machine having permissions level X (in a system where higher-numbered levels have more permissions) may alter execute permissions (and/or other permissions) in sets of permissions at permissions level X−1 or lower in entries in the reverse map table. A given virtual machine/sub virtual machine is not allowed to increase any permission level's set of permissions beyond the set of permissions associated with a current permissions level of the given virtual machine/sub virtual machine. In some of these embodiments, only already-validated entries, i.e., entries with the validated indicator already set, are allowed to have sets of permissions updated as described. In some embodiments, virtual machines/sub virtual machines use an RMT_ADJUST request to update sets of permissions in permissions levels in entries in the reverse map table.

Figure 9A:
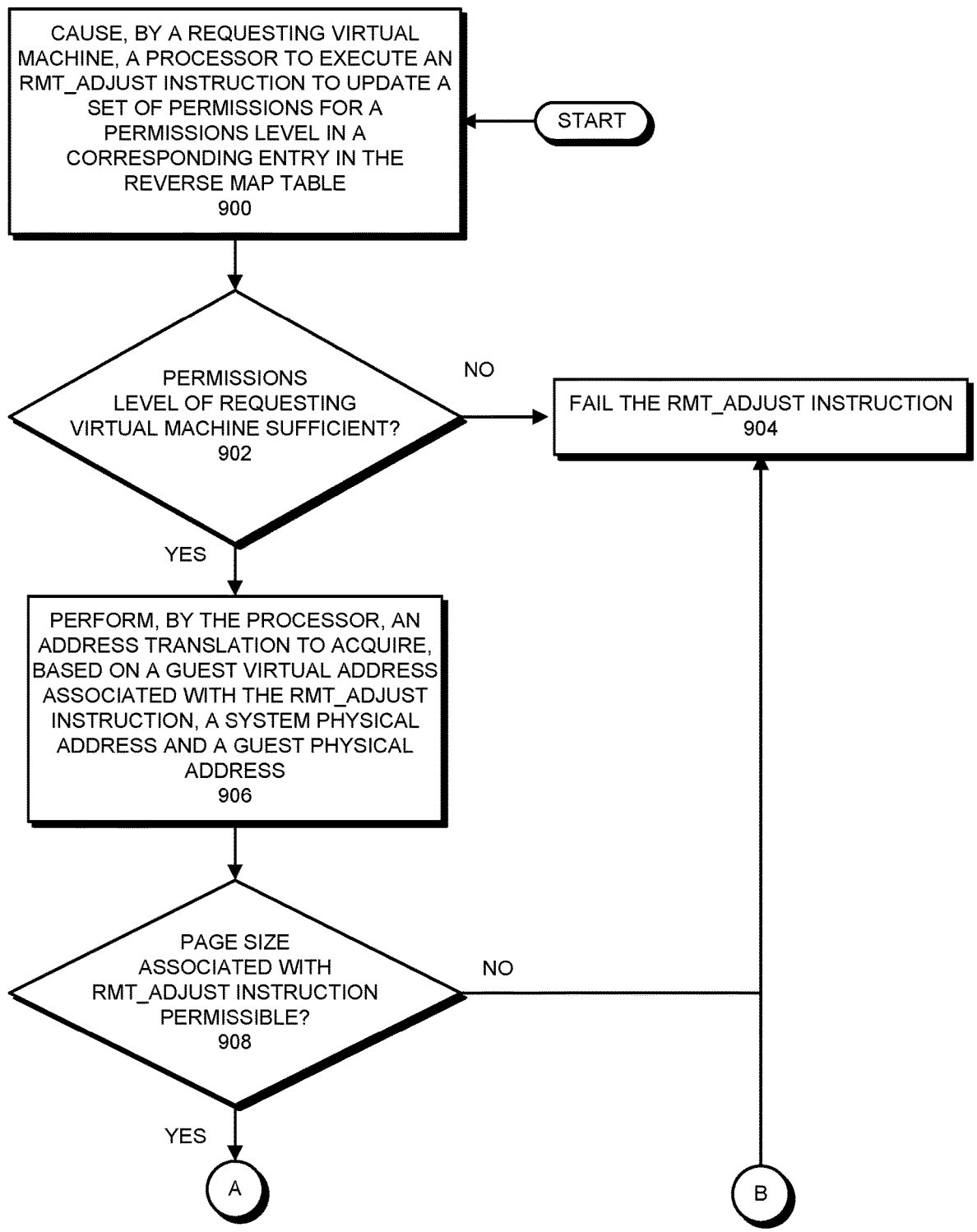
FIG. 9A presents a flowchart illustrating a process for executing an RMT_ADJUST instruction in accordance with some embodiments.
Figure 9B:
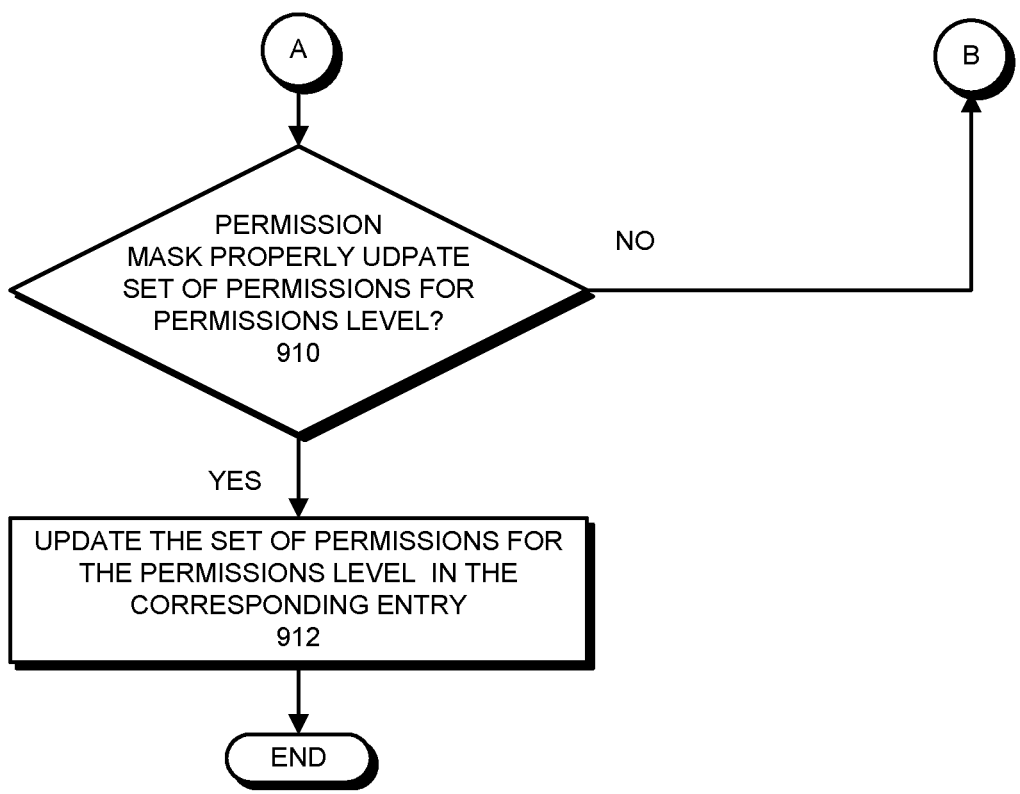
FIG. 9B presents a flowchart illustrating a process for executing an RMT_ADJUST instruction in accordance with some embodiments.

FIGS. 9A-9B present a flowchart illustrating a process for updating a set of permissions in a permission level in an entry in the reverse map table in accordance with some embodiments. The operations shown in FIGS. 9A-9B are presented as a general example of operations performed by some embodiments. The operations performed by other embodiments include different operations and/or operations that are performed in a different order. Additionally, although certain mechanisms/elements are used in describing the operations (e.g., a processor, etc.), in some embodiments, other mechanisms perform the operations and/or the operations are performed on other mechanisms/elements. For example, in some embodiments, the operations described as being performed when executing the RMT_ADJUST instruction are performed without requiring a dedicated instruction. For instance, in these embodiments, the input parameters may be written to reserved memory locations and the processor may, via an interrupt, hardware register (flag) value, or other mechanism, be caused to commence the described operations. As another example, in FIGS. 9A-9B, the operations are described as being performed by a virtual machine, but the operations may be performed by a sub virtual machine.

As can be seen in FIGS. 9A-9B, the process starts when a requesting virtual machine causes a processor to execute an RMT_ADJUST instruction to update a set of permissions for a permissions level in a corresponding entry in the reverse map table (step 900). In some embodiments, the RMT_ADJUST instruction takes, as input parameters, the guest virtual address, a page size (e.g., 4 kB, 2 MB, etc.), a target permissions level, and a virtual machine permission mask, which are used as described below in subsequent operations.

When executing the RMT_ADJUST instruction, the processor checks to ensure that a permissions level of the requesting virtual machine is sufficient (step 902). During this operation, the permissions level of the requesting virtual machine is compared to the permissions level that is to be updated in the entry to determine that the permissions level of the requesting virtual machine is higher than the permissions level for which the set of permissions is to be changed. In other words, the processor checks to ensure that the requesting virtual machine is sufficiently privileged to change the permissions level information in the entry. If the permissions level check fails, the processor fails the RMT_ADJUST instruction (step 904). "Failing" the RMT_ADJUST instruction, as used herein, means that the processor halts or terminates further processing of the RMT_ADJUST instruction and may transmit a failure reason code or assert a specified fault to the requesting virtual machine. When the permissions check does not fail, the processor requests a translation from the table walker for the guest virtual address, thereby acquiring the associated guest physical address and the system physical address (step 906).

The processor next checks the page size associated with the RMT_ADJUST instruction to ensure that the page size is permissible (step 908). Generally, during this operation, the processor checks to ensure that an improper page size is not included with the RMT_ADJUST instruction in order to avoid updating permissions for entries for incorrectly-sized pages. For example, the processor may confirm that the page size is properly aligned on page size boundaries and/or that that the page size in a corresponding entry in the reverse map table matches the page size. If the page-size check fails, the processor fails the RMT_ADJUST instruction (step 904).

When the page size is permissible, the processor checks the virtual machine permissions levels in the corresponding entry in the reverse map table to ensure that the virtual machine permission mask from the RMT_ADJUST instruction properly updates the permissions level (step 910). For example, the processor can check to ensure that the requested virtual machine permission mask does not provide more privileged access (i.e., give broader permissions) to the requesting virtual machine or another virtual machine than the privilege of the requesting virtual machine. If the permissions alterations check fails, the processor fails the RMT_ADJUST instruction (step 904).

When the checks in steps 902 and 908-910 are passed, the processor updates the permissions level in the corresponding entry (step 912). During this operation, the processor stores, in the set of permissions in the particular permissions level in the corresponding entry, a value, such as 1, 10110, or another value, that represents the permissions mask. In some embodiments, the permission mask overwrites all of the permissions indicators in the set of permissions for the permissions level. In some embodiments, the processor also transmits, to the requesting virtual machine, a success message or code.

In some embodiments, in addition to the other operations in FIGS. 9A-9B, the processor locks the entry in the reverse map table before performing the checks and the update (e.g., steps 908-912) using the lock indicator as described herein. In these embodiments, the processor selectively unlocks the entry (i.e., will return the lock to the previous locked/unlocked state) upon failing the RMT_ADJUST instruction or successfully updating the validated indicator in the corresponding entry.

In some embodiments, "unaware" virtual machines or portions thereof, i.e., virtual machines or portions thereof that do not (and maybe cannot) perform some or all of the operations for using the virtual machine permissions levels described herein can be assisted by other virtual machines in the use of the virtual machine permissions levels. In these embodiments, an unaware virtual machine should be associated with a lower permissions level and a higher-permissions level and "aware" virtual machine should be running on the computing device. The higher-permissions level virtual machine is informed of permissions faults for the unaware virtual machine (e.g., by the hypervisor or another entity) and then processes the permissions faults on behalf of the unaware virtual machine. In some of these embodiments, the higher permissions level virtual machine may be provided access to certain secure information of the unaware virtual machine, such as read access to an encrypted control block of the lower permission virtual machine, so that the higher permissions level virtual machine can interact with the unaware virtual machine and/or handle operations on behalf of the unaware virtual machine.

In some embodiments, virtual machine permissions levels may be enabled/disabled at specified times (i.e., are optionally and selectably enabled). For example, in some embodiments, virtual machine permissions levels are enabled (or not) at startup, as a particular event happens, as a hardware or software operating state changes, and/or at other times. In these embodiments, virtual machine permissions levels information is not used when virtual machine permissions levels are disabled—and thus the checks and other operations described herein are altered, in that they do not include the virtual machine permissions levels checks. In some of these embodiments, when virtual machine permissions levels are disabled, the reverse map table does not include information about and/or space for the permissions level information. In other words, when virtual machine permissions levels is disabled, each reverse map table entry may include less information and thus consume less space in memory.

Using the Reverse Map Table

Figure 10:
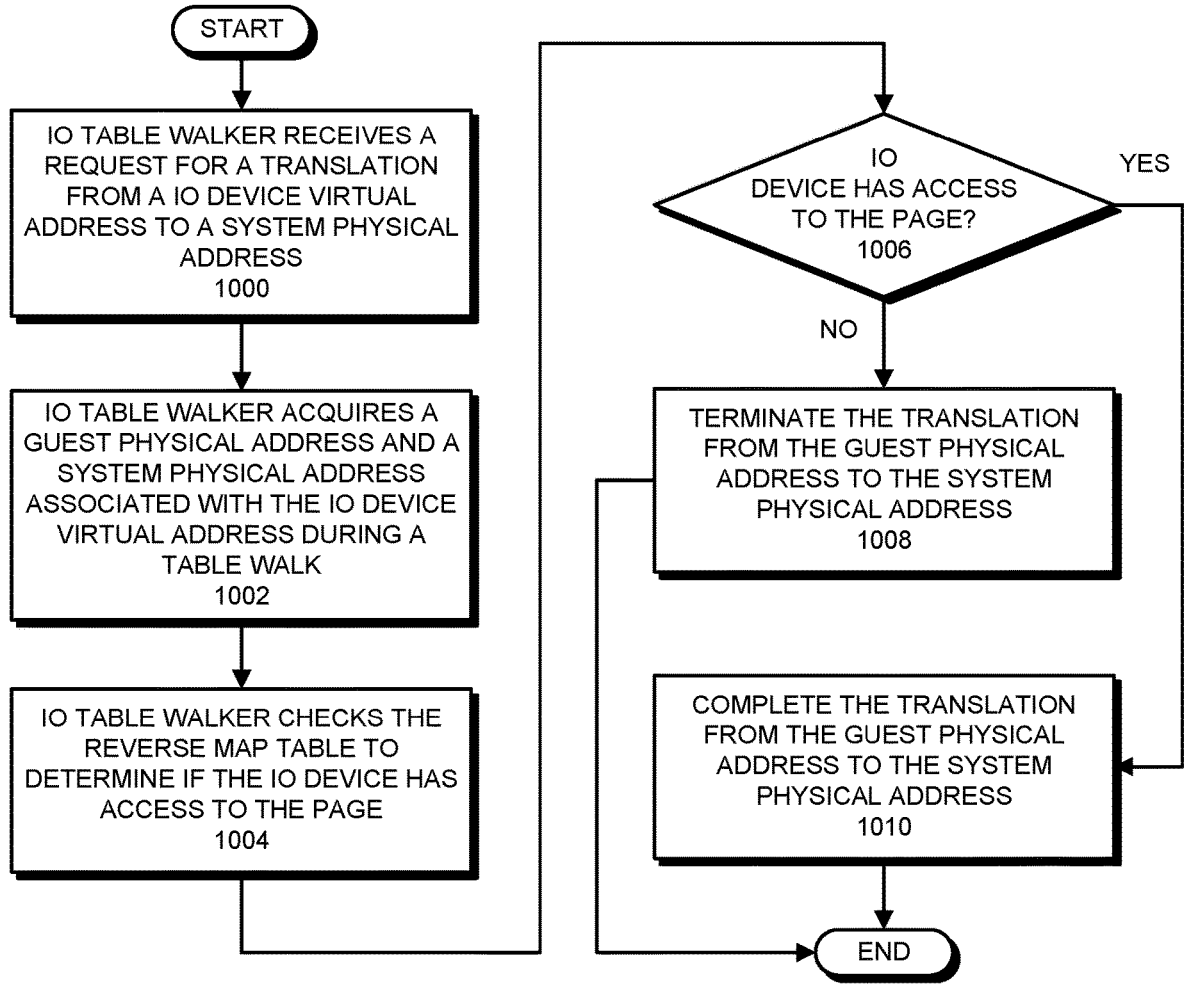
FIG. 10 presents a flowchart illustrating a process for using the reverse map table in accordance with some embodiments.

FIG. 10 presents a flowchart illustrating a process for using the reverse map table in accordance with some embodiments. The operations shown in FIG. 10 are presented as a general example of operations performed by some embodiments. The operations performed by other embodiments include different operations and/or operations that are performed in a different order. Additionally, although certain mechanisms/elements are used in describing the operations (e.g., a processor, etc.), in some embodiments, other mechanisms perform the operations and/or the operations are performed on other mechanisms/elements.

Figure 11:
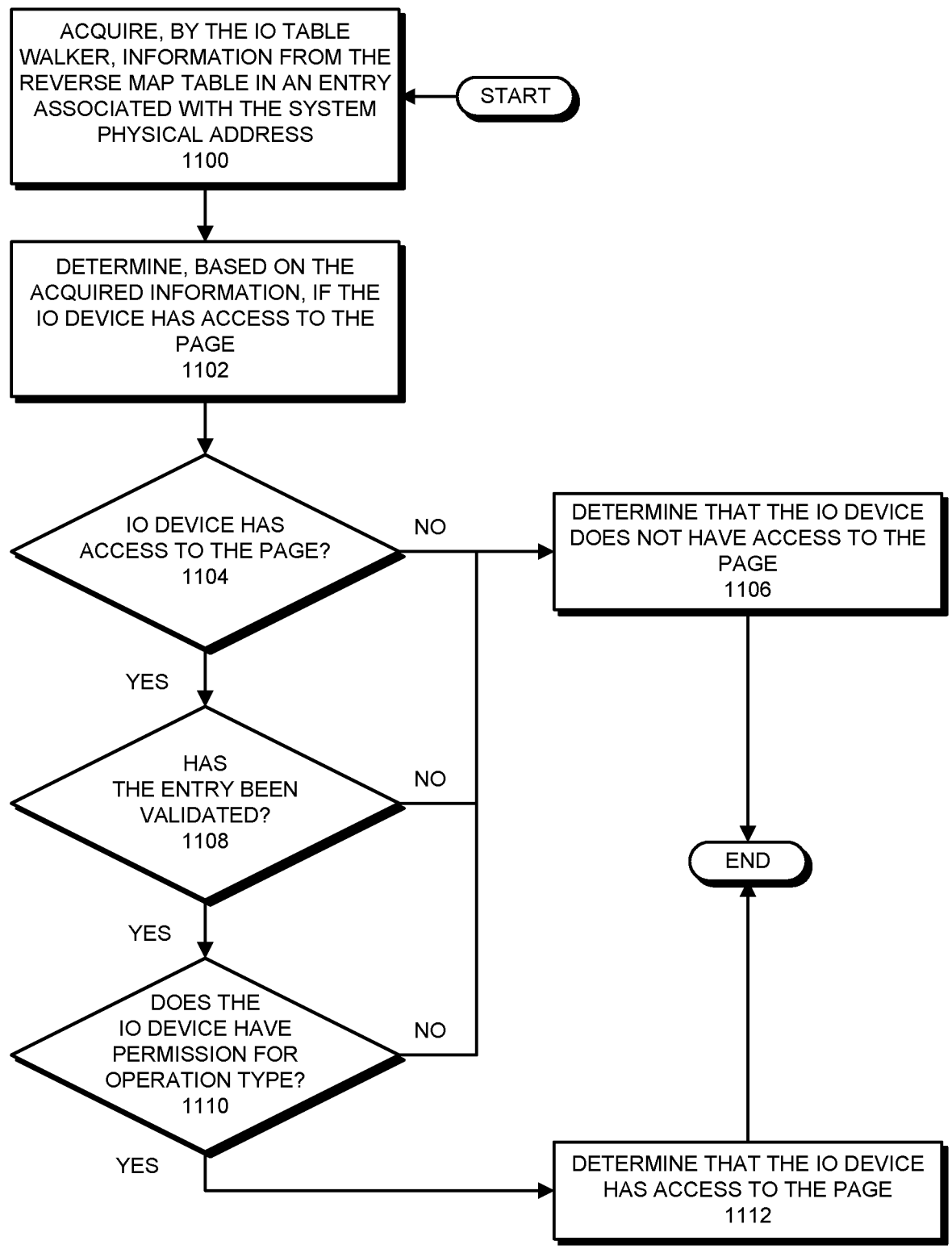
FIG. 11 presents a flowchart illustrating a process for checking the reverse map table to determine whether the virtual machine has access to the corresponding page in accordance with some embodiments.

For the process shown in FIGS. 10-11, an IO device makes a direct memory access (DMA) request to an IOMMU to access memory. Upon receiving the DMA request, an IO table walker in the IOMMU performs table walks to acquire a system physical address for the DMA as part of an "in-line" translation operation. The IO table walker then determines, using information from the reverse map table, if the system physical address is to be used for satisfying the DMA request—i.e., for performing the corresponding memory access. In some embodiments, similar operations are performed to check the reverse map table for system physical addresses acquired during table walks based on requests from virtual machines. Generally, in the described embodiments, the reverse map table is checked as described in FIGS. 10-11 to ensure that an entity (an IO device, a virtual machine, etc.) in the computing device is permitted to perform a requested access of a page in memory using a system physical address acquired from a nested page table.

In addition, for the process shown in FIGS. 10-11, it is assumed that the IO device is accessing a page in memory that has been allocated to a virtual machine. The same checks are performed, however, without regard as to whether a page is allocated to a virtual machine. For example, in some embodiments, there are pages in memory (e.g., "host pages") that are located outside of a region allocated to a virtual machine that may be accessible to an IO device, but the checks are still performed when a translating addresses. For such pages, although some of the checks described below do not apply, checks such as a check of the assigned indicator (should be unset/cleared for unassigned pages), the lock indicator (should be cleared for unlocked pages), and the sub-page count may be performed to ensure that the access to the page is permissible.

The process shown in FIG. 10 starts when an IO table walker in an IOMMU (e.g., IO table walker 246 in IOMMU 244) receives a request for a translation from an IO device virtual address to a system physical address (step 1000). For example, an IO device such as a disk controller may determine that data is to be written to a page of memory and may send a DMA request to the IOMMU to perform a memory access of a given operation type at the IO device virtual address associated with the page by the IO device. The IOMMU, upon receiving the DMA request from the IO device, may then request the translation from the IO device virtual address to a system physical address from the IO table walker.

For the purpose of the example in FIGS. 10-11, it is assumed that translation information for the IO device virtual address to a system physical address does not exist in a TLB associated with the IOMMU. The operation therefore proceeds to a table walk as described below. It should be noted, however, that the IO table walker checks a TLB (e.g., TLB 250) in an attempt to find a cached copy of the translation to avoid performing the table walk. In some embodiments, if such translation information did exist in the TLB in the IOMMU, the IO table walker could use the translation information without performing the checks in the reverse map table that are described in FIGS. 10-11. In these embodiments, the IOMMU is made to flush TLB entries upon changes being made in the reverse map table. In such embodiments, therefore, it is known that translation information stored in TLBs is safe to use without checking the reverse map table—as no changes to the reverse map table are permitted without also flushing TLB entries. TLB flushes are described in more detail below.

The IO table walker then performs table walks in the IO page table and the nested page table, eventually acquiring a guest physical address and the system physical address associated with the IO device virtual address (step 1002). While acquiring the system physical address during the page table walk, the IO table walker may also acquire other information from the nested page table (or elsewhere), such as the size of the page, etc.

Upon acquiring the system physical address, the IO table walker checks the reverse map table to determine whether the IO device has access to the corresponding page (step 1004). FIG. 11 presents a flowchart illustrating a process for checking the reverse map table to determine whether the IO device has access to the corresponding page in accordance with some embodiments. The operations shown in FIG. 11 are presented as a general example of operations performed by some embodiments. The operations performed by other embodiments include different operations and/or operations that are performed in a different order. Additionally, although certain mechanisms/elements are used in describing the operations (e.g., an IO table walker, etc.), in some embodiments, other mechanisms perform the operations and/or the operations are performed on other mechanisms/elements.

In the described embodiments, for the operations shown in FIG. 10-11, the IOMMU is configured to determine, given a request to access a page of memory by an IO device, information about a virtual machine to which the page is allocated—and with which the IO device is interacting. For example, the IOMMU can determine a virtual machine guest ID that is to be associated with the request. In some embodiments, the IOMMU maintains records that are used for acquiring the information about the virtual machine. For example, the IOMMU may keep a device identifier to guest ID mapping table that is used to look up guest IDs associated with IO devices. In some embodiments, IO devices include the information about the virtual machine in requests to the IOMMU. In some embodiments, the IOMMU acquires the information about the virtual machines from another functional block in the computing device. The IOMMU uses the information about the virtual machine during the checks of the reverse map table described below to determine if the system physical address acquired during the page table walk is to be used to perform the memory access requested by the IO device, etc. In other words, in these embodiments, an IO device, while interacting with a virtual machine, may provide or be associated with the information about the virtual machine so that the IO device is able to access pages of memory allocated to the virtual machine.

As shown in FIG. 11, the process starts when the IO table walker acquires, from reverse map table 242, information in an entry associated with the system physical address (step 1100). For example, the IO table walker may acquire the information from an entry in the reverse map table 242 at an offset from a base address of the reverse map table 242 proportional to or otherwise based on the system physical address. As described above, in some embodiments, the information from the entry includes some or all of a guest ID, a recorded guest physical address, a sub-page count, a validated indicator, a size, permissions level information, an assigned indicator, etc.

The IO table walker then determines, based on the acquired information, if the IO device has access to the page (step 1102). For example, the IO table walker can determine whether the entry is assigned (i.e., currently assigned to one or more virtual machines), as shown by the assigned indicator. As another example, the IO table walker can determine if the guest physical address from the entry matches the guest physical address acquired during the table walk. As another example, the IO table walker can determine if the page size acquired from the nested page table matches the page size from the entry. As another example, the IO table walker can determine if the recorded guest ID from the entry matches an identifier associated with the requesting IO device (i.e., an identifier for the virtual machine that is associated with the IO device). As another example, the IO table walker can determine if the entry is marked as locked (and thus may be in the process of being updated or modified). As another example, for a write access, the IO table walker can determine that the page is not marked as immutable. When any one of these checks fails, i.e., the information from the entry in the reverse map table does not agree with the information from the table walk and/or the information in the reverse map table indicates that the IO device does not have access, the IO table walker determines that the IO device does not have access to the page (step 1106).

When the acquired information indicates that the IO device has access to the page (step 1104), the IO table walker determines if the information from the entry indicates that the page has been validated (step 1108). For example, the IO table walker can determine if the validated indicator from the acquired information is set to a specified value, such as 1, indicating that the page has been validated. When the page has not been validated, the IO table walker determines that the IO device does not have access to the page (step 1106). In other words, if the information from the entry in reverse map table 242 indicates that the virtual machine to which the page is allocated has not marked the page as validated, the IO table walker determines that the IO device does not have access to the page. Recall that the validated indicator is cleared/unset, thereby setting the entry to indicate that the page has not been validated, each time that the hypervisor updates the entry (via the RMT_UPDATE operation), thereby indicating that the mapping from guest physical address to system physical address (or other information in the entry) has changed. When the validated indicator shows that the page has been validated, therefore, it is known that the hypervisor has not changed the entry.

The IO table walker also determines whether the requesting IO device has permission to perform an operation type indicated in the translation request (step 1110). During this operation, the IO table walker uses a permissions level associated with the IO device (e.g., a permissions level assigned to the virtual machine to which the page is allocated and with which the IO device is interacting, a permissions level assigned to the IO device itself, a permissions level assigned to the IOMMU and used for IO devices, etc.) to determine if corresponding permissions level information from the entry in the reverse map table indicates that operation type is permissible. For example, the IO table walker can check one or more bits of a bitmask for a set of permissions associated with the permissions level of the entry in the reverse map table to determine if the one or more bits indicate that the operation type is permissible. When the IO device does not have permission for the operation type, the IO table walker determines that the IO device does not have access to the page (step 1106).

In contrast to the above-described cases, when IO device is determined to have access (step 1104), the entry has been validated (step 1108), and the IO device has permission for the operation type (step 1110), the IO table walker determines that the IO device has access to the page (step 1112). In this case, the information about the IO device and the request agree with, and are permissible in view of, the information in the entry in the reverse map table, meaning that the requested access of the page is allowed.

Returning to FIG. 10, when the IO device does not have access to the corresponding page (step 1006), the IO table walker terminates the translation from the guest physical address to the system physical address (step 1008). During this operation, the IO table walker may assert a fault or perform another remedial action, and/or otherwise terminate the translating and may not use the system physical address for performing the memory access—i.e., may terminate the memory access. For example, when the validated indicator is unset/cleared, a validated fault or guest page fault may be asserted to the IO device or IOMMU (and/or other software entities) so that the IO device or IOMMU can determine how to handle the fault. In this case, the IO device or IOMMU may subsequently cause the virtual machine to validate the entry (e.g., using the PVALIDATE instruction) and proceed with operations such as retrying the translation or access of the page. Alternatively, the IO device or IOMMU may refuse to use information from the entry—and may perform error handling operations. As another example, when the requesting IO device has insufficient permissions, a permissions fault may be asserted to the IO device or IOMMU and/or other entities, thereby enabling the IO device, IOMMU, and/or other entities to handle the permissions fault (such as by adjusting permissions, canceling the operation, having another entity perform the operation, etc.).

Otherwise, when the IO device has access to the corresponding page (step 1006), the IO table walker completes the translation from the guest physical address to the system physical address (step 1010). Completing the translation includes using the system physical address for performing the memory access (i.e., as part of an in-line translation of the address in the memory access request). The IOMMU may also cache the returned virtual address to physical address translation (i.e., the virtual address to system physical address translation) in a TLB for subsequent lookups.

Translation Lookaside Buffer Flushes

As described above, computing device 200 can include TLBs such as TLB 238-240 in cores 214-216 and TLB 250 in IOMMU 244 that are used to cache copies of address translation information, such as IO device virtual address to system physical address translation information. In the described embodiments, before a table walker permits given address translation information to be stored in one or more TLBs (and/or used for other operations), the table walker checks the address translation information using information from a corresponding entry in the reverse map table as described herein (e.g., for FIGS. 10-11, etc.). In this way, only address translation information that is known to be safe to use in view of the reverse map table is permitted to be stored in TLBs. While the address translation information remains cached in the one or more TLBs, however, one or more entities in the computing device may make changes to the information in the corresponding entry in the reverse map table. For example, the hypervisor may send an RMT_UPDATE request such as described in FIG. 7 to update an assigned indicator, a guest physical address, and/or other information in the corresponding entry in the reverse map table. As another example, the hypervisor may send a PSMASH request to change the arrangement of pages as described in more detail herein. As yet another example, a virtual machine may execute a PVALIDATE instruction as described in FIG. 8 or an RMT_ADJUST request as described in FIGS. 9A-9B. The change in the reverse map table renders the address translation information in the one or more TLBs stale and/or improper to use for subsequent translation operations. Because the reverse map table is not again checked before address translation information from a TLB is used for performing virtual address to physical address translations, it is possible that the stale and improper address translation information in the one or more TLBs could be used to perform memory accesses. This could lead to accesses of unexpected and incorrect data in memory, execution of undesired program code, and/or other problems.

The described embodiments avoid the above-described issues with address translation information cached in TLBs by performing TLB flushes (sometimes called "TLB shootdowns") upon changing information in the reverse map table. Generally, during a TLB flush, address translation information in the TLB is invalidated and may be deleted or otherwise removed, thereby preventing the address translation information from being used in subsequent translation operations. In some embodiments, during a flush of a given TLB, all of the address translation information in the given TLB is invalidated. In other words, when a change is made in the reverse map table, in order to avoid using stale and improper address translation information cached in a given TLB, all of the address translation information in the TLB is invalidated. While this type of flush is efficient in terms of the operations for flushing the TLB, subsequent page table walks may be needed to reacquire useful address translation information that was invalidated during the flush. In some embodiments, during a flush of a given TLB, only selected address translation information in the given TLB is invalidated. For example, in some embodiments, each piece of address translation information in the given TLB is associated with a guest ID for the virtual machine to which the corresponding page is assigned. In these embodiments, flushes may be made for particular guest IDs, so that only address translation information that is associated with a particular guest ID is invalidated. This type of flush maintains unaffected address translation in the given TLB, so less table walks may be needed to reacquire useful address translation information. The flushing operation itself, however, is more computationally intensive, as the given TLB must be searched for entries matching the guest ID.

In some embodiments, a modified/extended distributed virtual memory (DVM) technique is used for performing the TLB flushes upon updating the reverse map table. Generally, DVM is a messaging mechanism by which an "originating" core (e.g., core 214) can, via a controller, cause all cores in a computing device to perform TLB flushes. For DVM, in order to cause the TLB flush, the originating core transmits, to the controller, an DVMOpReq message. Upon receiving the DVMOpReq message, the controller transmits, on a channel that is monitored by all cores, a DVMOpReq message to cause each core to flush its TLB. The originating core also transmits a DVMSyncReq message to the controller, which causes the controller to transmit a DVMSyncReq message on the channel. In response to receiving the DVMSyncReq message, each core, upon completing prior DVM operations including the flush, transmits, to the controller, a DVMCompReq message. Upon receiving a DVMCompReq message from each core, the controller transmits, on the channel, a DVMCompReq message that informs the originating core that all of the other cores have completed the TLB flush.

In some embodiments, the above-described DVM technique is extended to enable the specification of whether a TLB flush is to be performed in the IOMMU—and not simply the cores as described above. In these embodiments, certain DVM request messages include an indicator that is interpreted by the controller to indicate either (1) only cores should be instructed to flush TLBs or (2) the IOMMU and the cores should be signaled to flush TLBs. For example, in some embodiments, one or more request address bits and/or other bits in DVM messages may be set to a first value to indicate that only cores should be instructed to flush TLBs and set to second value to indicate that the IOMMU and IO devices and the cores should be signaled to flush TLBs.

Figure 12:
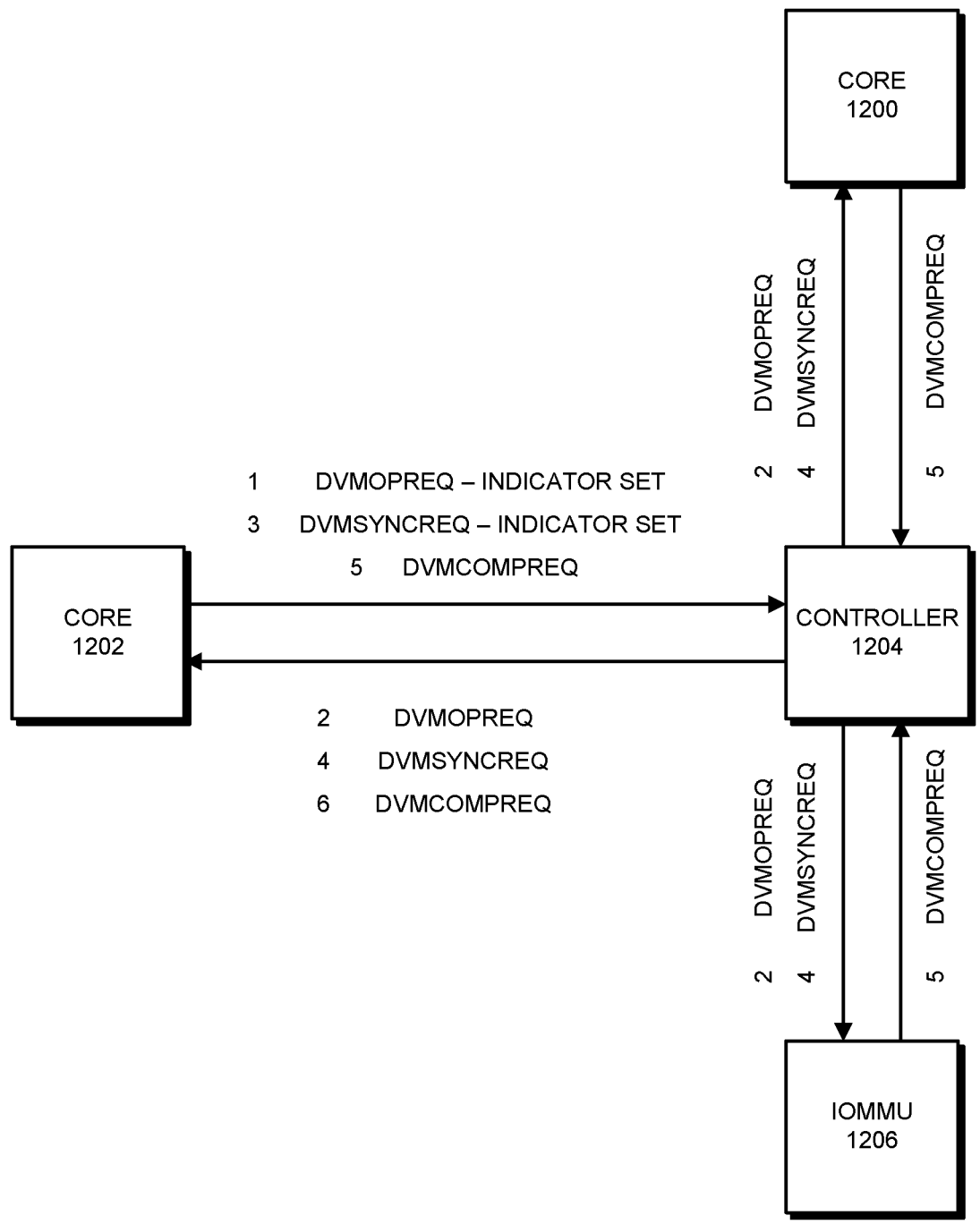
FIG. 12 presents a block diagram illustrating messages exchanged during a translation lookaside buffer (TLB) flush for cores and an input-output memory management unit (IOMMU) in accordance with some embodiments.

FIG. 12 presents a block diagram illustrating DVM messages exchanged during a TLB flush for cores and an IOMMU in accordance with some embodiments. The operations and messages shown in FIG. 12 are presented as a general example of operations performed and messages used by some embodiments. The operations performed and messages used by other embodiments include different operations, operations that are performed in a different order, and/or different messages. Additionally, although certain mechanisms/elements are used in describing the operations (e.g., a core, etc.), in some embodiments, other mechanisms perform the operations and/or the operations are performed on other mechanisms/elements. In some embodiments, cores 1200-1202 and IOMMU 1206 are similar to cores 214-216 and IOMMU 244 in FIG. 2, i.e., are similarly included and situated in a computing device such as computing device 200, although this is not a requirement.

For the operations shown in FIG. 12, an originating core 1202 communicates with controller 1204 to cause TLBs to be flushed in cores 1200-1202 and IOMMU 1206. As described above, such a flush may be performed when the originating core 1202 has made an update to the reverse map table that renders address translation information in (or that may be in) TLBs in cores 1200-1202 and IOMMU 1206 stale and improper to use for subsequent operations. The operations in FIG. 12 are numbered 1-6 to illustrate an order in which the operations occur and messages are exchanged with regard to the other operations and messages in FIG. 12. The numbers provide a general sense of timing of operations and messages, but do not require or imply that the operations and/or messages occur at a particular time and/or at a same time.

As can be seen in FIG. 12, originating core 1202 initially transmits, to controller 1204, a DVMOpReq message with an indicator set to indicate that the flush is for all cores 1200-1202 and IOMMU 1206 (1). Upon receiving the DVMOpReq message, controller 1204 transmits, on a channel (e.g., a serial or parallel bus, a signal line, etc.) that is monitored by all cores, a DVMOpReq message to cause each core 1200-1202 to flush its TLB and, on a channel monitored by IOMMU 1206, a DVMOpReq message to cause IOMMU 1206 to flush its TLB (2). Originating core 1202 also transmits a DVMSyncReq message to controller 1204 with an indicator set to indicate that a sync request to be transmitted to all cores 1200-1202 and IOMMU 1206 (3). In response the DVMSyncReq message, controller 1204 transmits, on the corresponding channels, a DVMSyncReq message to cores 1200-1202 and a DVMSyncReq message to IOMMU 1206 (4). In response to receiving the DVMSyncReq message, each core, upon completing the TLB flush, transmits, to controller 1204, a DVMCompReq message (5). In response to receiving the DVMSyncReq message, IOMMU 1206, upon completing the TLB flush, transmits, to controller 1204, a DVMCompReq message (5). Upon receiving a DVMCompReq message from each core and IOMMU 1206, controller 1204 transmits, on the channel, a DVMCompReq message that informs originating core 1202 that the TLB flush is completed in cores 1200-1202 and IOMMU 1206 (6).

As can be seen in FIG. 12, the operations differ from the typical DVM operations in that the indicator in the DMVOpReq (1) and DVMSyncReq (3) is used to control where subsequent messages are directed. Although a separate figure is not provided, if the indicator had been set (or unset/cleared) to indicate that only the cores were to perform the TLB flush (i.e., opposite to what is shown in FIG. 12), controller 1204 would not have communicated the various messages shown in FIG. 12 to the IOMMU. In this way, the DVM operations are extended to cover the case where the IOMMU is/is not to be flushed.

In some embodiments, the DVMOpReq message includes information in addition to the above-described indicator of which functional blocks are to be involved in a TLB flush operation. For example, the DVMOpReq may include a guest ID, a TLB invalidate indicator, and/or other information. In these embodiments, the additional information may be used to control the TLB flushes in corresponding ways. For example, a guest ID may be included in the DVMOpReq message in an embodiment that in which TLB flushes are limited to TLB entries having the same guest ID (i.e., in embodiments where TLBs are selectively flushed of particular entries).

Address Translation Caching

As described above, in some computing devices, IO devices and IOMMUs support an address translation caching (ATC) scheme. For ATC, an IO device prefetches and stores address translation information in an IOTLB in the IO device. For example, an IO device may request, from an IOMMU, a system physical address associated with each IO device virtual address in a sequence of IO device virtual addresses in pages in memory that the IO device is preparing to access. The IO device, upon receiving the system physical address associated with each IO device virtual address in responses from the IOMMU, stores corresponding address translation information in a local IOTLB for subsequent use. By prefetching and caching the address translation information in the IOTLB in this way, IO devices can prepare in advance for accessing pages, which may improve the speed of performing subsequent memory accesses—in comparison to IO devices for which address translations must be performed as memory accesses are performed.

Although ATC can help IO devices operate more efficiently, in embodiments in which the reverse map table is used to ensure that IO devices are permitted to access pages in memory as described herein, unmodified ATC is not used. The described embodiments instead use a modified version of the ATC scheme in which the IOMMU provides only partially-translated translation information for storage in IO device IOTLBs. In other words, instead of providing full IO device virtual address to system physical address translation information, the described embodiments provide only the guest physical addresses associated with IO device virtual addresses.

Recall that the translation between the IO device virtual address and the guest physical address is acquired by performing a table walk in the IO page table (e.g., IO page table 248). The IO page table is protected from access by the hypervisor (and other entities in the computing device), so this translation is known to be safe. The same cannot be said for the nested page table, which is accessible to the hypervisor (and other entities in the computing device). Translation information from the nested page table is therefore checked using the reverse map table as described herein before being used to perform memory accesses requested by IO devices. In other words, when an IO device uses a cached guest physical address from the IOTLB in a memory accesses request, the IO table walker translates the guest physical address into a system physical address using the nested page table. As part of the process of translating the guest physical address into a system physical address, the IO table walker checks the reverse map table to ensure that the system physical address is permitted to be used for performing the requested memory access for the IO device. More specifically, operations similar to those shown FIGS. 10-11 are performed, with the exception that the translation from IO device virtual address to guest physical address need not be performed (step 1002), as the previously-cached guest physical address (and not the IO device virtual address) is included in the request.

Figure 13:
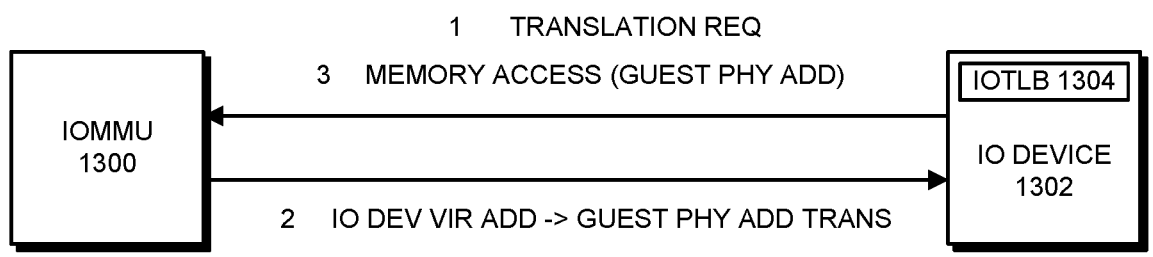
FIG. 13 presents a block diagram illustrating messages exchanged between an IOMMU and an IO device using an Address Translation Caching (ATC) scheme in accordance with some embodiments.

FIG. 13 presents a block diagram illustrating messages exchanged between the IOMMU and an IO device using the modified ATC scheme in accordance with some embodiments. The operations and messages shown in FIG. 13 are presented as a general example of operations performed and messages used by some embodiments. The operations performed and messages used by other embodiments include different operations, operations that are performed in a different order, and/or different messages. Additionally, although certain mechanisms/elements are used in describing the operations (e.g., the IOMMU, etc.), in some embodiments, other mechanisms perform the operations and/or the operations are performed on other mechanisms/elements. In some embodiments, IOMMU 1300 and IO device 1302 are similar to IOMMU 244 and IO device 208 in FIG. 2, i.e., are similarly included and situated in a computing device such as computing device 200, although this is not a requirement.

The operations in FIG. 13 are numbered 1-3 to illustrate an order in which the operations occur and messages are exchanged with regard to the other operations and messages in FIG. 13. The numbers provide a general sense of timing of operations and messages, but do not require or imply that the operations and/or messages occur at a particular time.

As can be seen in FIG. 13, IO device 1302, which includes IOTLB 1304, initially transmits, to IOMMU 1300, a translation request (1). The translation request includes an IO device virtual address and requests that IOMMU 1300 provide IO device 1302 with IO device virtual address to system physical address translation information to be stored in IOTLB 1304. In response to the request, and in accordance with the modified ATC scheme, IOMMU 1300 provides, to IO device 1302, partial translation information, i.e., provides a guest physical address associated with the IO device virtual address (2). IO device 1302 stores the IO device virtual address to guest physical address translation information in ITOLB 1304.

IO device 1302 subsequently transmits, to IOMMU 1300, a memory access request that includes the guest physical address from ATC 1304 (3). IOMMU 1300 performs a table walk in the nested page table to acquire a system physical address associated with the guest physical address. IOMMU 1300 also checks a corresponding entry in the reverse map table to ensure that IO device 1302 is permitted to access the page of memory before using the physical address for performing the memory access.

Shared Pages

In some embodiments, pages in memory can be shared by two or more virtual machines. In other words, individual pages may be accessible by two or more virtual machines. For example, pages that include program code from common libraries (stdlib.h, etc.), applications, kernel routines, etc. may be shared. As another example, pages of data that are to be read by virtual machines may be shared. In some embodiments, shared pages may be globally shared pages, in that the pages are commonly used and therefore shareable by at least some, and possibly all, virtual machines. In these embodiments, the computing device uses various mechanisms for controlling access to shared pages. For example, in some embodiments, the globally shared page indicator in an entry for the page in reverse map table 242 may be set to a specified value (e.g., 1) to indicate that the page is shared, an immutable indicator may be set to indicate that the page is immutable, etc. In some embodiments, shared pages are encrypted with a key that is shared between virtual machines that are permitted shared access to the page.

In some embodiments, only certain types of accesses are permitted for shared pages. For example, writes may be impermissible for shared pages. During the above-described check of the reverse map table, in some embodiments, a table walker checks virtual machine permissions levels to ensure that impermissible memory accesses (such as writes) are not being performed. In these embodiments, the table walker may determine that the virtual machine does not have access to the page when the memory access is impermissible for a shared page. Some checks, such as checks of the validated indicator, are not performed for shared pages.

Encrypted Pages

In some embodiments, pages in memory that are allocated to a given virtual machine are encrypted using a key specific to the given virtual machine (e.g., as a security measure). In these embodiments, virtual machines may include an indicator associated with each page that shows whether the corresponding page is encrypted. In some embodiments, the above-described checks of the reverse map table are not performed for unencrypted pages (as these pages may be generally presumed to be unsecure/untrustworthy). Shared pages may be unencrypted and/or encrypted using a key known to all virtual machines.

Enabling/Disabling Checks of the Reverse Map Table

In some embodiments, a hardware or software switch is available for enabling and disabling the above-described checks of the reverse map table. For example, each virtual machine may be provided with a flag in software, a register, etc. that can have a specified value (e.g., 1) written to the flag, register, etc. to enable the above-described checks. In these embodiments, when the flag, register, etc. is set to another value (e.g., 0), the checks are not performed.

Page Smashing

In some embodiments, pages of a particular size, e.g., 4 kB pages, may be "smashed" or combined with other pages to form a page of a larger size, e.g., a 2 MB page. In addition, pages may be "un-smashed" or divided so that a larger page, e.g., 2 MB, is divided into a number of smaller pages, e.g., 4 kB pages. In some of these embodiments, a hypervisor can send, to a processor (e.g., processor 202), a PSMASH request (which means executing a dedicated instruction, writing to a specified processor register, etc.). The PSMASH request is then executed by the processor to perform the combine/divide operations. In these embodiments, before performing the combine/divide operations, the processor checks the reverse map table to ensure that the pages can be combined or divided, such as ensuring that all pages are allocated and owned by the same virtual machine, that pages are validated, that pages are not immutable and not locked, etc. The processor also flushes TLBs—possibly only flushing a subset of TLB entries that is associated with the corresponding guest ID. The processor then updates corresponding entries in the reverse map table to reflect the newly combined or divided pages.

In some embodiments, a computing device (e.g., computing device 200 in FIG. 2 and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, memory controllers, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 200 and/or some portion thereof) is stored on a non-transitory computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations. In addition, entities may be referred to in describing some embodiments. Generally, an entity can include hardware functional blocks (e.g., individual circuits or circuit elements, complex circuits, ASICs, processors, etc.) and/or software programs (e.g., routines, applications, functions, etc.) that can perform the operations ascribed to or otherwise associated with the entity.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An apparatus, comprising:
an input-output (TO) device;
an input-output memory management unit (IOMMU) comprising an IO table walker; and
a memory that stores a reverse map table (RMT), a nested page table, and a plurality of pages of memory;
wherein the IO table walker is configured to:
receive, based on an access request from the IO device, a request to translate an IO device virtual address into a system physical address associated with a page of memory;
use a guest physical address associated with the IO device virtual address to acquire the system physical address from a corresponding entry in the nested page table;
perform one or more checks in the RMT to ensure that the guest physical address is correctly mapped to the system physical address in the nested page table and that the IO device has access to the page; and
when the guest physical address is correctly mapped to the system physical address in the nested page table and the IO device has access to the page, provide the system physical address for use in performing the access for the IO device.

2. The apparatus of claim 1, wherein the checks in the RMT to ensure that the guest physical address is correctly mapped to the system physical address in the nested page table comprise:
checking a recorded guest physical address in an entry in the RMT associated with the system physical address to determine whether the recorded guest physical address matches the guest physical address,
wherein the recorded guest physical address is an address that is recorded as being previously mapped to the system physical address, and
wherein the guest physical address is correctly mapped to the system physical address in the nested page table when the recorded guest physical address matches the guest physical address.

3. The apparatus of claim 2, wherein the checks in the RMT to ensure that the IO device has access to the page further comprise:
checking one or more permissions level indicators in the entry to determine whether an operation type identified in the access request is permissible for the IO device, wherein the IO device has access to the page of memory when the operation type is permissible.

4. The apparatus of claim 2, wherein the checks in the RMT to ensure that the IO device has access to the page further comprise:
performing a validation check to determine whether a virtual machine previously validated the entry, wherein the IO device has access to the page when the virtual machine previously validated the entry.

5. The apparatus of claim 2, wherein the checks in the RMT to ensure that the IO device has access to the page further comprise:
checking an assigned indicator in the entry to determine whether the entry is marked as being currently assigned;
checking a recorded identifier in the entry that identifies a previously-accessing virtual machine to determine whether an identifier provided by the IO device in the access request matches the recorded identifier; and
checking a recorded page size in the entry that indicates a size of a page of memory associated with the system physical address to determine whether a page size indicated in the access request matches the recorded page size,
wherein the IO device has access to the page of memory when at least one of the following occurs: the entry is marked as being currently assigned, the identifier matches the recorded identifier, and the page size matches the recorded page size.

6. The apparatus of claim 1, wherein providing the system physical address to the IO device comprises:
when the guest physical address is not correctly mapped to the system physical address in the nested page table or the IO device does not have access to the page, not providing the system physical address for use in performing the access for the IO device.

7. An apparatus, comprising:
an input-output (TO) device;
an input-output memory management unit (IOMMU) comprising a translation lookaside buffer (TLB); and
a memory that stores a reverse map table (RMT), a page table, and a plurality of pages of memory;
wherein the IOMMU is configured to:
store, in the TLB, page table entry information acquired during page table walks, each piece of page table entry information having been determined, via one or more checks in the RMT, to be permissible for use in performing memory accesses for a corresponding page for the IO device;
receive, due to a change in the RMT, an indication that the TLB is to be flushed; and
upon receiving the indication, flush the TLB, the flushing comprising selectively invalidating one or more TLB entries in the TLB.

8. The apparatus of claim 7, wherein the indication includes an identifier, and wherein selectively flushing the TLB comprises invalidating only entries in the TLB with recorded identifiers that match the identifier.

9. The apparatus of claim 8, wherein the identifier is a virtual machine identifier identifying a virtual machine.

10. The apparatus of claim 7, wherein selectively flushing the TLB comprises invalidating all entries in the TLB.

11. The apparatus of claim 7, wherein receiving the indication that the TLB is to be flushed comprises receiving a flush request message, the flush request message being a first distributed virtual memory (DVM) request message.

12. The apparatus of claim 11, wherein the IOMMU is further configured to:
receive a synchronization message requesting an acknowledgement that prior messages have been processed, the synchronization message being a second DVM request message; and
when the flush request message has been processed, transmitting, in response to the synchronization message, a completion message, the completion message being a third DVM request message.

13. The apparatus of claim 11, further comprising:
one or more cores; and
a controller configured to:
receive, from an originating core of the one or more cores, a first DVM request message having a specified indicator set, thereby indicating that a flush of TLBs in the IOMMU and the one or more cores is requested; and
in response to the request, transmitting the first DVM request message to the IOMMU and the first DVM request message to the one or more cores to cause the IOMMU and the one or more cores to flush TLBs.

14. The apparatus of claim 7, wherein the change in the RMT changes information in at least one entry that may render a piece of page table entry information in the TLB impermissible for use in performing memory accesses for the corresponding page on behalf of the IO device.

15. An apparatus, comprising:
an input-output (TO) device comprising an input-output translation lookaside buffer (IOTLB);
an input-output memory management unit (IOMMU); and
a memory that stores a reverse map table (RMT) and an IOMMU page table;
wherein the IOMMU is configured to:
receive, from the IO device, a request to provide address translation information to be cached in the IOTLB; and
provide, to the IO device, partial translation information, the partial translation information comprising a guest physical address acquired during a page table walk of an IOMMU page table.

16. The apparatus of claim 15, further comprising:
a nested page table stored in the memory;
wherein the IOMMU is further configured to:
- receive, from the IO device, a request to perform a memory access, the request including the guest physical address;
- use the guest physical address to acquire, from the nested page table, a system physical address associated with the guest physical address;
- perform one or more checks in the RMT to ensure that the guest physical address is correctly mapped to the system physical address in the nested page table and that the IO device has access to the page; and
- selectively provide, based on the one or more checks in the RMT, the system physical address for use in performing the memory access.

17. The apparatus of claim 16, wherein providing, based on the one or more checks in the RMT, the system physical address for use in performing the memory access comprises:
- when the guest physical address is not correctly mapped to the system physical address or the TO device does not have access to the page, not providing the system physical address for use in performing the access for the TO device.

18. The apparatus of claim 16, wherein providing, based on the one or more checks in the RMT, the system physical address for use in performing the memory access comprises:
- when the guest physical address is correctly mapped to the system physical address and the TO device has access to the page, providing the system physical address for use in performing the access for the TO device.

\* \* \* \* \*